United States Patent
Mitsuzuka et al.

(10) Patent No.: US 10,626,213 B2
(45) Date of Patent: *Apr. 21, 2020

(54) PHOTOELASTIC POLYURETHANE RESIN, DETECTION MEMBER, ROBOT, AND METHOD FOR PRODUCING PHOTOELASTIC POLYURETHANE RESIN

(71) Applicants: MITSUI CHEMICALS, INC., Tokyo (JP); A SCHOOL CORPORATION KANSAI UNIVERSITY, Osaka (JP)

(72) Inventors: Masahiko Mitsuzuka, Yokohama (JP); Satoshi Yamasaki, Chiba (JP); Yoshiro Tajitsu, Suita (JP)

(73) Assignees: MITSUI CHEMICALS, INC., Tokyo (JP); A SCHOOL CORPORATION KANSAI UNIVERSITY, Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/548,011

(22) PCT Filed: Feb. 5, 2016

(86) PCT No.: PCT/JP2016/053564
§ 371 (c)(1),
(2) Date: Aug. 1, 2017

(87) PCT Pub. No.: WO2016/125905
PCT Pub. Date: Aug. 11, 2016

(65) Prior Publication Data
US 2018/0022861 A1 Jan. 25, 2018

(30) Foreign Application Priority Data

Feb. 5, 2015 (JP) .................................. 2015-020948
Aug. 4, 2015 (JP) .................................. 2015-154429

(51) Int. Cl.
*C08G 18/66* (2006.01)
*C08G 18/65* (2006.01)
*C08G 18/32* (2006.01)
*C08G 18/48* (2006.01)
*C08G 18/76* (2006.01)
*G01L 7/08* (2006.01)

(52) U.S. Cl.
CPC ..... *C08G 18/6677* (2013.01); *C08G 18/3206* (2013.01); *C08G 18/4854* (2013.01); *C08G 18/65* (2013.01); *C08G 18/7671* (2013.01); *C08G 18/7685* (2013.01); *G01L 7/086* (2013.01)

(58) Field of Classification Search
CPC ............ C08G 18/6677; C08G 18/7685; C08G 18/7671; C08G 18/4854; C08G 18/3206; C08G 18/65; G01L 7/086
See application file for complete search history.

(56) References Cited

U.S. PATENT DOCUMENTS

| | | | |
|---|---|---|---|
| 5,189,117 | A | 2/1993 | Hefner, Jr. |
| 5,917,180 | A | 6/1999 | Reimer |
| 2006/0152378 | A1 | 7/2006 | Lokhorst |
| 2012/0070112 | A1 | 3/2012 | Mitachi |
| 2013/0036829 | A1 | 2/2013 | Van Steenberge |
| 2013/0333094 | A1 | 12/2013 | Rogers |
| 2013/0338330 | A1 | 12/2013 | Nakagawa |

FOREIGN PATENT DOCUMENTS

| | | |
|---|---|---|
| JP | 02-292317 | 12/1990 |
| JP | 09-157344 | 6/1997 |
| JP | 2009-022567 | 2/2009 |
| JP | 2011063773 A | 3/2011 |
| JP | 2012-193293 | 10/2012 |
| JP | 2014527841 A1 | 10/2014 |
| WO | 2013138574 A2 | 9/2013 |
| WO | 2014046054 | 3/2014 |

OTHER PUBLICATIONS

Extended European Search Report dated Aug. 13, 2018 for the corresponding European Patent Application No. 16746735.6.
International Search Report dated Apr. 26, 2016 filed in PCT/JP2016/053564.
International Preliminary Report on Patentability dated Aug. 17, 2017 filed in PCT/JP2016/053564, total 13 pages.
International Preliminary Report on Patentability dated Aug. 17, 2017 filed in PCT/JP2016/053563, total 13 pages.
Extended European Search Report dated Aug. 13, 2018 for European Patent Application No. 16746734.9.
International Search Report dated Apr. 26, 2016 filed in PCT/JP2016/053563.

*Primary Examiner* — Rabon A Sergent
(74) *Attorney, Agent, or Firm* — Rankin, Hill & Clark LLP

(57) ABSTRACT

The photoelastic polyurethane resin has a Young's modulus at 25° C. of 2 to 5 MPa, a photoelastic constant at 25° C. of $1000 \times 10^{-12}$ $Pa^{-1}$ to $100000 \times 10^{-12}$ $Pa^{-1}$, and a glass transition temperature of −60° C. to −21° C.

10 Claims, 16 Drawing Sheets

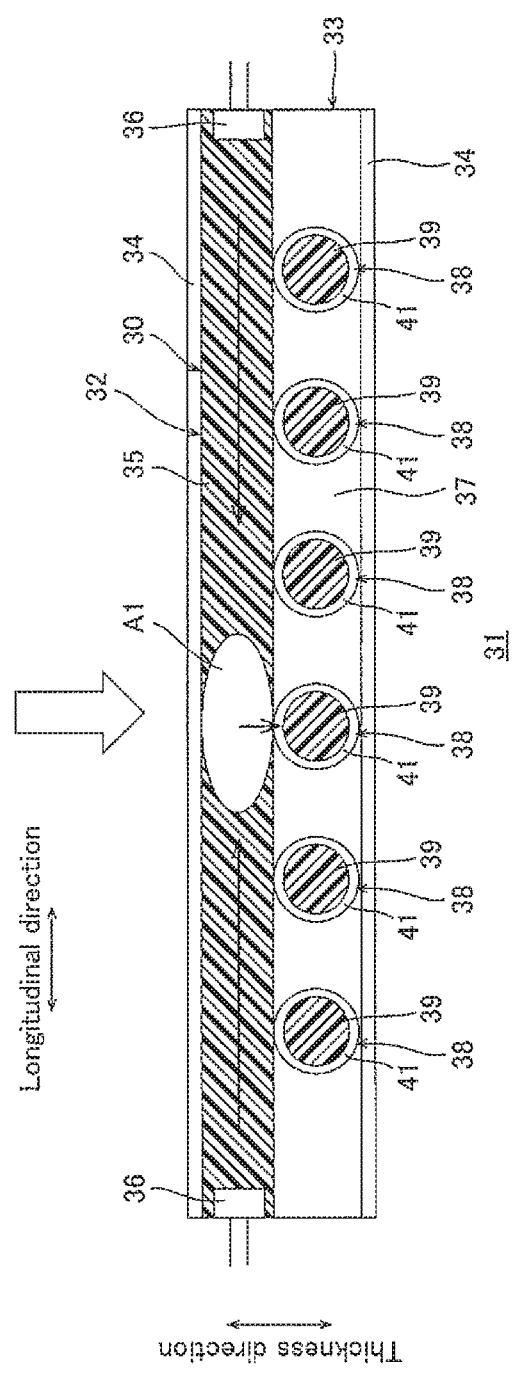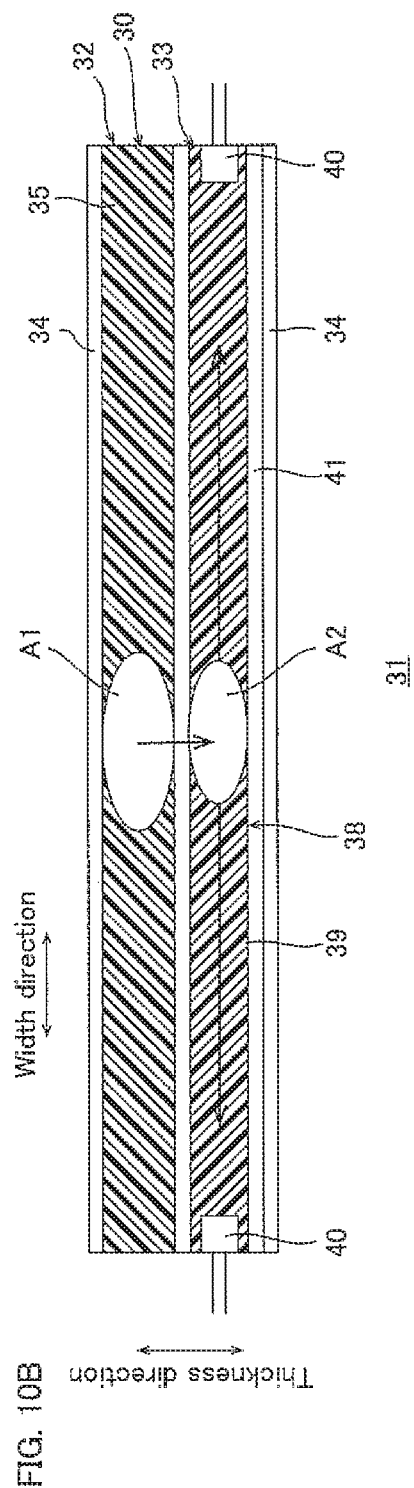

PHOTOELASTIC POLYURETHANE RESIN, DETECTION MEMBER, ROBOT, AND METHOD FOR PRODUCING PHOTOELASTIC POLYURETHANE RESIN

TECHNICAL FIELD

The present invention relates to photoelastic polyurethane resin, a detection member, a robot, and a method for producing photoelastic polyurethane resin. In particular, the present invention relates to photoelastic polyurethane resin, a detection member including the photoelastic polyurethane resin, a robot including the detection member, and a method for producing photoelastic polyurethane resin.

BACKGROUND ART

Conventionally, use of polyurethane resin having photoelasticity as a sensor such as a pressure-sensitive sensor has been proposed.

For example, Patent Document 1 below has proposed a touch panel including a polyurethane molded article for a pressure-sensitive sensor made of polyurethane resin, and a light generating unit and a light receiving unit that are provided so as to sandwich the polyurethane molded article for a pressure-sensitive sensor (see below).

The touch panel detects birefringence caused inside the polyurethane molded article for a pressure-sensitive sensor when a pressure is applied by, for example, a finger based on attenuation of light that was allowed to exit from the light generating unit and enters the light receiving unit.

CITATION LIST

Patent Document

[Patent Document 1] Japanese unexamined patent publication 2012-193293

SUMMARY OF THE INVENTION

Problem to be Solved by the Invention

However, with the polyurethane resin described in the above-described Patent Document 1, the birefringence is not generated right after the pressure application, and when the polyurethane resin is used as a sensor, responsiveness may be poor.

In particular, responsiveness tends to be reduced in a cold district.

Thus, an object of the present invention is to provide photoelastic polyurethane resin that can provide a detection member having excellent responsiveness, in particular excellent responsiveness in a cold district, a detection member including the photoelastic polyurethane resin, a robot including the detection member, and a method for producing photoelastic polyurethane resin.

Means for Solving the Problem

[1] The first invention of the present invention includes photoelastic polyurethane resin having a Young's modulus at 25° C. of 2 to 5 MPa, a photoelastic constant at 25° C. of $1000 \times 10^{-12}$ Pa$^{-1}$ to $10000 \times 10^{-12}$ Pa$^{-1}$, and a glass transition temperature of −60° C. to −21° C.

[2] The first invention of the present invention includes the photoelastic polyurethane resin of [1] above, wherein the photoelastic polyurethane resin has a glass transition temperature of −60° C. to −25° C.

[3] The second invention of the present invention include a detection member including the photoelastic polyurethane resin of [1] or [2] above, a light generating member disposed at a first position at which light can be allowed to enter the photoelastic polyurethane resin, and a light receiving member disposed at a second position that is different from the first position and at which the light that is allowed to exit from the light generating member and passed through the photoelastic polyurethane resin can be received.

[4] The second invention of the present invention includes the detection member of [3] above, wherein the photoelastic polyurethane resin is in a sheet shape.

[5] The second invention of the present invention includes the detection member of [3] above, wherein the photoelastic polyurethane resin is in a bar shape.

[6] The second invention of the present invention includes the detection member of any one of [3] to [5] above, wherein the detection member detects a pressure applied to the photoelastic polyurethane resin.

[7] The second invention of the present invention includes the detection member of any one of [3] to [5] above, wherein the detection member detects bending of the photoelastic polyurethane resin.

[8] The second invention of the present invention includes the detection member of any one of [3] to [7] above, further including a cushioning material laminated on the photoelastic polyurethane resin.

[9] The third invention of the present invention includes a robot including the detection member of any one of [3] to [8] above.

[10] The fourth invention of the present invention include a robot including the detection member of [6] above, and a processor that measures a pressure applied to the detection member based on the detection of the detection member.

[11] The fifth invention of the present invention includes a method for producing photoelastic polyurethane resin, the method including allowing aromatic polyisocyanate, a high-molecular weight polyol having an average hydroxyl number of 20 to 500 mgKOH/g, and a low-molecular-weight polyol having an average hydroxyl number of more than 500 mgKOH/g to react, wherein the photoelastic polyurethane resin has a Young's modulus at 25° C. of 2 to 5 MPa, a photoelastic constant at 25° C. of $1000 \times 10^{-12}$ Pa$^{-1}$ to $100000 \times 10^{-12}$ Pa$^{-1}$, and a glass transition temperature of −60° C. to −21° C.

Effect of the Invention

In the photoelastic polyurethane resin of the present invention, the Young's modulus at 25° C. is adjusted to 2 to 5 MPa, the photoelastic constant at 25° C. is adjusted to $1000 \times 10^{-12}$ Pa$^{-1}$ to $100000 \times 10^{-12}$ Pa$^{-1}$, and the glass transition temperature is adjusted to −60° C. to −21° C.

Therefore, a detection member having excellent responsiveness, especially at a cold district can be produced.

The detection member of the present invention includes the above-described photoelastic polyurethane resin, and therefore responsiveness, responsiveness at especially in a cold district is excellent.

The robot of the present invention includes the above-described detection member, and therefore can be operated with good responsiveness even in a cold district.

BRIEF DESCRIPTION OF THE DRAWINGS

FIG. 10A is a longitudinal cross section of the pressure-sensitive mat shown in FIG. 9. FIG. 10B is a widthwise cross section of the pressure-sensitive mat shown in FIG. 9.

DESCRIPTION OF EMBODIMENTS

First Embodiment

Figure 1:
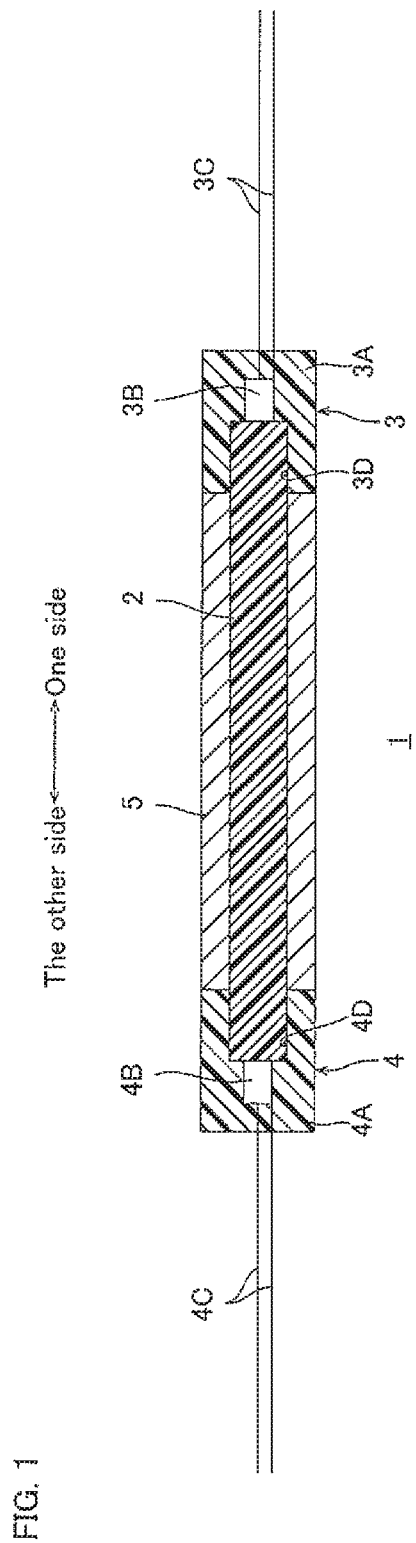
FIG. 1 is a cross-sectional view illustrating a sensor as a first embodiment of the detection member of the present invention.

The photoelastic polyurethane resin of the present invention can be produced by allowing a polyurethane resin composition containing a polyisocyanate component and an active hydrogen group-containing component to react and cure.

The polyisocyanate component contains, as an essential component, aromatic ring-containing polyisocyanate. The aromatic ring-containing polyisocyanate contains a 1,4-phenylene group (w here a portion of the hydrogen atoms in the 1,4-phenylene group can be replaced with a methyl group and/or a methoxy group.) and/or a 1,5-naphthylene group.

Examples of the aromatic ring-containing polyisocyanate containing a 1,4-phenylene group include benzene ring-containing polyisocyanates (to be specific, benzene ring-containing diisocyanates) such as 4,4'-diphenylmethane diisocyanate (4,4'-MDI), polymer of 4,4'-diphenylmethane diisocyanates (carbodiimide modified MDI, uretonimine modified MDI, acyl urea modified MDI, etc.), 2,4'-diphenylmethane diisocyanate (2,4'-MDI), 3,3'-dimethylbiphenyl-4,4'-diisocyanate (TODI), 3,3'-dimethoxybiphenyl-4,4'-diisocyanate, p-phenylenediisocyanate, 4,4'-diphenyl diisocyanate, 4,4'-diphenylether diisocyanate, 2,4-tolylene diisocyanate (2,4-TDI), and 1,4-xylylene diisocyanate (1,4-XDI).

Examples of the aromatic ring-containing polyisocyanate containing a 1,5-naphthylene group include naphthalene ring-containing polyisocyanate (to be specific, naphthalene ring-containing diisocyanate) such as 1,5-naphthalene diisocyanate (1,5-NDI).

Of the aromatic ring-containing polyisocyanate containing a 1,4-phenylene group and/or a 1,5-naphthylene group, preferably, 4,4'-diphenylmethane diisocyanate (4,4'-MDI), 3,3'-dimethylbiphenyl-4,4'-diisocyanate (TODI), and 1,5-naphthalene diisocyanate (1,5-NDI) are used.

The polyisocyanate component can be used singly, or can be used in combination of two or more. Preferably, 4,4'-MDI and TODI are used in combination.

The polyisocyanate component can contain other polyisocyanate, i.e., polyisocyanate other than the aromatic ring-containing polyisocyanate, as an optional component.

Examples of the other polyisocyanate include aromatic polyisocyanates (excluding the above-described aromatic ring-containing polyisocyanate), araliphatic polyisocyanates (excluding the above-described aromatic ring-containing polyisocyanate), alicyclic polyisocyanates, and aliphatic polyisocyanates.

Examples of the aromatic polyisocyanate include aromatic diisocyanates such as 2,2'-MDI, 2,6-TDI, m-phenylenediisocyanate, and 2,6-NDI.

Examples of the araliphatic polyisocyanates include araliphatic diisocyanates such as 1,3-xylylene diisocyanate (1,3-XDI), and tetramethylxylylene diisocyanate (TMXDI).

Examples of the alicyclic polyisocyanates include alicyclic diisocyanates such as 3-isocyanatomethyl-3,5,5-trimethylcyclohexyl isocyanate (isophorone diisocyanate, IPDI), 4,4'-, 2,4'- or 2,2'-dicyclohexylmethanediisocyanate or a mixture thereof ($H_{12}$MDI), 1,3-bis(isocyanatomethyl) cyclohexane (hydrogenated xylylene diisocyanate, $H_6$XDI), 2,5- or 2,6-bis(isocyanatomethyl) norbornane or a mixture thereof (NBDI), 1,3-cyclopentanediisocyanate, 1,4- or 1,3-cyclohexanediisocyanate or a mixture thereof, methyl-2,4-cyclohexanediisocyanate, and methyl-2,6-cyclohexanediisocyanate.

Examples of the aliphatic polyisocyanate include aliphatic diisocyanates such as trimethylenediisocyanate, tetramethylenediisocyanate (TMDI), pentamethylenediisocyanate (PDI), hexamethylenediisocyanate (HDI), 1,2-, 2,3- or 1,3-butylenediisocyanate, and 2,4,4- or 2,2,4-trimethylhexamethylenediisocyanate.

In the polyisocyanate component, the aromatic ring-containing polyisocyanate containing 1,4-phenylene group and/or 1,5-naphthylene group is blended in an amount of, relative to a total amount of the polyisocyanate component, for example, 30 mass % or more, more preferably 50 mass % or more, particularly preferably 90 mass % or more.

The polyisocyanate component has an aromatic ring concentration of, relative to the polyurethane resin composition, for example, 10 mass % or more, preferably 12 mass % or more, and generally for example, 30 mass % or less, preferably 26 mass % or less, more preferably 16 mass % or less.

When the polyisocyanate component has an aromatic ring concentration of the above-described lower limit or more, excellent photoelasticity can be obtained.

When the polyisocyanate component has an aromatic ring concentration of the above-described upper limit or less, excellent photoelasticity can be obtained.

The aromatic ring concentration of the polyisocyanate component is the mass ratio of the aromatic ring derived from the polyisocyanate component in the polyurethane resin composition, and does not include the aromatic ring derived from the cyano compound to be described later.

The aromatic ring concentration is calculated, when the polyisocyanate component contains 1,4-phenylene group, by setting the molecular weight of the polyisocyanate to 78 (g/mol), and when the polyisocyanate component contains 1,5-naphthylene group, by setting the molecular weight of the polyisocyanate to 128 (g/mol).

The active hydrogen group-containing component is a compound having an active hydrogen group (for example, hydroxyl group, amino group, etc.), and for example, polyol and polyamine, preferably polyol is used.

The polyol preferably contains a high-molecular weight polyol.

The high-molecular weight polyol is a compound having two or more hydroxyl groups and an average hydroxyl number (described later) of 20 to 500 mgKOH/g, and when the average functionality (described later) is 2, it is a compound having a number average molecular weight of 225 or more, or when the average functionality is 3, it is a compound having a number average molecular weight of 337 or more.

Examples of the high-molecular weight polyol include polyetherpolyol, polyesterpolyol, polycarbonatepolyol, polyolefinpolyol, dimer polyol, polyurethane polyol, polyoxyalkylenepolyester block copolymer polyol, acrylic polyol, epoxypolyol, natural oil polyol, silicone polyol, and fluorine polyol.

Examples of the polyether polyol include polyoxyalkylene polyol such as polyalkylene (C2 to 3) polyol and polytetramethylene ether polyol.

Examples of the polyalkylene (C2 to 3) polyol include addition polymerized product (random and/or block copolymer of two or more alkylene oxides) of alkylene oxides such as, for example, ethylene oxide and propylene oxide using the low-molecular-weight polyol as an initiator. To be specific, for example, polyethylene glycol, polypropylene glycol, and an ethylene oxide-propylene oxide copolymer (random and/or block copolymer) are used.

The low-molecular-weight polyol is a compound having two or more hydroxyl groups and an average hydroxyl number (described later) of more than 500 mgKOH/g, and when it has a functionality (described later) of 2, it is diol having a molecular weight of 40 or more and less than 225, or when it has a functionality of 3, it is triol having a molecular weight of 40 or more and less than 337.

Examples of the low-molecular-weight polyol include diols (dihydric alcohol) such as aliphatic diols (having 2 to 13 carbon atoms) including ethylene glycol, propylene glycol (1,2-propanediol), trimethyleneglycol (1,3-propanediol), 1,4-butyleneglycol (1,4-butanediol), 1,3-butyleneglycol (1,3-butanediol), 1,2-butyleneglycol, 2-methyl-1,3-propanediol, 1,5-pentanediol, neopentyl glycol, 3-methyl-1,5-pentanediol, 2,4-diethyl-1,5-pentanediol, 1,6-hexanediol, and 2-ethyl-1,3-hexanediol, alkane (having 7 to 13 carbon atoms) diols, and alkene (having 4 to 13 carbon atoms) diols such as 1,4-dihydroxy-2-butene and 2,6-dimethyl-1-octene-3,8-diol; alicyclic diols (having 6 to 13 carbon atoms) such as cyclohexanedimethanol; aromatic diols (aromatic ring-containing diol containing an aromatic ring and having 6 to 13 carbon atoms) such as bishydroxyethoxybenzene and xylene glycol; and diols (having 2 to 9 carbon atoms) of oxyalkylene alcohols including diethylene glycol, trioxyethylene glycol, tetraoxyethylene glycol, dipropylene glycol, and trioxypropylene glycol; triols (trihydric alcohol) such as aliphatic triols having 3 to 6 carbon atoms including glycerin, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol, and other aliphatic triols (having 7 to 20 carbon atoms); tetraols (tetrahydric alcohol)(having 5 to 27 carbon atoms) such as tetramethylolmethane (pentaerythritol) and diglycerin (diglycerol); pentaols (pentahydric alcohol)(having 5 to 33 carbon atoms) such as xylitol; hexaols (hexahydric alcohol) (having 6 to 40 carbon atoms) such as sorbitol, mannitol, allitol, iditol, dulcitol, altritol, inositol, and dipentaerythritol; heptahydric alcohols (heptaol) (having 7 to 47 carbon atoms) such as perseitol; and octaol (octahydric alcohol) (having 8 to 54 carbon atoms) such as sucrose.

These low-molecular-weight polyols can be used singly, or can be used in combination of two or more.

Examples of the polytetramethylene ether polyol include a ring-opening polymerized product produced by cationic polymerization of tetrahydrofuran; noncrystalline polytetramethylene ether glycol produced by copolymerizing the above-described diol with a polymerization unit of tetrahydrofuran; and noncrystalline polytetramethylene ether glycol produced by copolymerizing ethylene oxide, propyleneoxide, epichlorohydrin and/or benzylglycidyl ether with a polymerization unit of tetrahydrofuran.

Examples of the polyetherpolyol include aromatic ring-containing polyol produced by addition polymerization of aromatic diols such as the above-described aromatic ring-containing diol (to be specific, bishydroxyethoxybenzene, etc.) having 6 to 13 carbon atoms, and aromatic ring-containing diol (to be specific, bishydroxyethylterephthalate, bisphenol A, etc.) having a hydroxyl number of 500 mgKOH/g or less with ethylene oxide, propylene oxide, and/or tetrahydrofuran.

For the polyetherpolyol, preferably, polytetramethylene ether glycol is used.

For the polyesterpolyol, for example, polyesterpolyol produced by the reaction of the above-described low-molecular-weight polyol with polybasic acid or its acid anhydride or its acid halide is used.

Examples of the polybasic acid and its acid anhydride or its acid halide include carboxylic acid (dicarboxylic acid) such as oxalic acid, malonic acid, succinic acid, methyl succinic acid, glutaric acid, adipic acid, 1,1-dimethyl-1,3-dicarboxypropane, 3-methyl-3-ethyl glutaric acid, azelaic acid, sebacic acid, other aliphatic dicarboxylic acids (C11-C13), hydrogenated dimer acid, maleic acid, fumaric acid, itaconic acid, orthophthalic acid, isophthalic acid, terephthalic acid, toluene dicarboxylic acid, dimer acid and HET acid; and acid anhydride derived from these carboxylic acids, such as oxalic anhydride, succinic anhydride, maleic anhydride, phthalic anhydride, 2-alkyl (C12-C18) succinic anhydride, tetrahydrophthalic anhydride and trimellitic anhydride; and also acid halide derived from these carboxylic acid anhydrides such as oxalic dichloride, adipic dichloride and sebacic dichloride.

Examples of the polyesterpolyol include lactone-based polyester polyol such as polycaprolactone polyol and polyvalerolactone polyol produced by ring-opening polymerization of lactones such as ε-caprolactone and γ-valerolactone using the above-described low-molecular-weight polyol as an initiator.

Examples of the polyester polyol further include vegetable oil polyesterpolyol produced by condensation reaction of the above-described low-molecular-weight polyol with hydroxycarboxylic acid such as hydroxyl group-containing vegetable oil fatty acid (for example, castor oil fatty acid containing ricinoleic acid and hydrogenated castor oil fatty acid containing 12-hydroxystearic acid, etc.) under known conditions.

The polycarbonate polyol can be produced by, for example, allowing phosgene, dialkylcarbonate, diallylcarbonate, and alkylenecarbonate to react in the presence or absence of a catalyst, using the above-described low-molecular-weight polyol as an initiator. For the polycarbonatepolyol, preferably, polycarbonatediol using diol as an initiator is used.

For the polyolefinpolyol, polybutadienepolyol and polyisoprenediol produced by adding a hydroxyl group to a terminal of polymer of conjugated double bond-containing monomer such as butadiene and isoprene are used.

Examples of the dimer polyol include dimer diols produced by reducing unsaturated fatty acid dimer having 18 carbon atoms as a main component, which can be generally obtained as an industrial material.

Examples of the polyurethane polyol include polyetherpolyurethane polyol, polyesterpolyurethane polyol, polycarbonatepolyurethane polyol, or polyesterpolyetherpolyurethane polyol produced by allowing the polyetherpolyol, polyesterpolyol and/or polycarbonatepolyol as described above to react with the above-described polyisocyanate component at a ratio such that the equivalent ratio (OH/NCO) of the hydroxyl group relative to the isocyanate group is more than 1.

Examples of the polyoxyalkylenepolyester block copolymer polyol include, as shown in Japanese Examined Patent Publication Sho 48-10078, those having a structure in which polyoxyalkylene polyol is blocked with polyester chain. That is, examples include those polyoxyalkylene polyol or its derivative having a hydroxyl group in which the portion replaced with the hydrogen atom in the hydroxy group is represented by general formula (A) below:

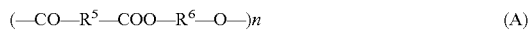

(where R5 and R6 each represents a divalent hydrocarbon group, and n represents a number more than 1 in average).

In general formula (A), examples of the divalent hydrocarbon group represented by R5 include saturated aliphatic or aromatic polycarboxylic acid residue, examples of the divalent hydrocarbon group represented by R6 include a residue produced by cleaving a compound having a cyclic ether group, and n is preferably an integer of 1 to 20.

The polyoxyalkylenepolyester block copolymer polyol is produced by allowing the above-described polyoxyalkylene polyol (polyetherpolyol) to react with polycarboxylic acid anhydride and alkyleneoxide.

The high-molecular weight polyol has an average hydroxyl number of 20 to 500 mgKOH/g, preferably 80 to 300 mgKOH/g, more preferably 100 to 250 mgKOH/g.

The hydroxyl number (unit: mgKOH/g) of the high-molecular weight polyol can be determined by acetylation or phthalation accordance to method A or method B of JIS K 1557-1.

The average hydroxyl number (unit: mgKOH/g) of the high-molecular weight polyol is the same as the hydroxyl number of the high-molecular weight polyol when the high-molecular weight polyol is used singly. Meanwhile, the average hydroxyl number of the high-molecular weight polyol is their average value when the high-molecular weight polyol is used in combination.

When the average hydroxyl number of the high-molecular weight polyol is more than the range described above, the photoelastic polyurethane resin may have an excessively high Young's modulus, and the desired photoelastic constant may not be obtained. Meanwhile, when the average hydroxyl number is less than the range described above, the glass transition temperature is excessively low, and processability and scratch resistance may be reduced.

The high-molecular weight polyol has an average functionality of, for example, 1.9 to 3, preferably 1.9 to 2.5, more preferably 2.0 to 2.2.

The functionality of the high-molecular weight polyol is a number of the hydroxyl group of the high-molecular weight polyol. To be specific, it is the number of active hydroxyl groups per one molecule.

The average functionality of the high-molecular weight polyol is an average value of the active hydroxyl group per one molecule of the high-molecular weight polyol. That is, when high-molecular weight polyols having different functionalities are mixed (used in combination), the numeral value showing the ratio of the number of the active hydroxyl group of the mixture relative to the number of the molecules of the mixture of the high-molecular weight polyol is the average functionality of the high-molecular weight polyol.

The average functionality of the high-molecular weight polyol can also be determined from formula (B) below:

The average functionality=total of(functionality of each high-molecular weight polyol×equivalent number)/total of equivalent number of high-molecular weight polyols  (B)

The high-molecular weight polyol has a number average molecular weight of, for example, 225 to 20,000, preferably 500 to 15,000.

The number average molecular weight can be determined from formula (C) below:

The number average molecular weight=56100×average functionality/average hydroxyl number  (C)

When the average functionality of the high-molecular weight polyol is more than the above-described range, the photoelastic polyurethane resin may not achieve a desired photoelastic constant. Meanwhile, when the average functionality is less than the above-described range, the Young's modulus may be excessively low, and processability and scratch resistance may be reduced.

For the high-molecular weight polyol, preferably, polyetherpolyol, polyesterpolyol, polycarbonatepolyol, and polyolefinpolyol are used.

More preferably, polytetramethylene ether polyol, and polycarbonatepolyol (to be specific, polycarbonatediol) are used.

The polytetramethylene ether glycol has an average hydroxyl number of 100 to 250 mgKOH/g, preferably 100 to 220 mgKOH/g. When the polytetramethylene ether glycol has an average hydroxyl number within the above-described range, a high photoelasticity and high rigidity can be achieved both.

The polycarbonate diol has an average hydroxyl number of 100 to 250 mgKOH/g, preferably 150 to 250 mgKOH/g. When the polycarbonate diol has an average hydroxyl number within the above-described range, high photoelasticity and high rigidity can be achieved both.

These high-molecular weight polyols can be used singly, or can be used in combination of two or more.

The polyol can contain the above-described low-molecular-weight polyol, in addition to the above-described high-molecular weight polyol.

When the polyol contains the low-molecular-weight polyol, the average hydroxyl number of the polyol increases, and to the extent of the increase, to adjust the isocyanate index (described later) to a desired value, a large amount of the above-described polyisocyanate component (preferably, aromatic ring-containing polyisocyanate) can be blended in the polyurethane resin composition. Therefore, the photoelastic constant of the photoelastic polyurethane resin can be increased.

For the low-molecular-weight polyol, preferably diol, triol, and tetraol are used. To be specific, diol having 2 to 10 carbon atoms, triol having 3 to 10 carbon atoms, and tetraol having 5 to 10 carbon atoms are used.

Examples of the diol having 2 to 10 carbon atoms include aliphatic diols (having 2 to 10 carbon atoms) including ethylene glycol, propylene glycol, trimethyleneglycol (1,3-propanediol), 1,4-butyleneglycol, 1,3-butyleneglycol, 1,2-butyleneglycol, 2-methyl-1,3-propanediol, 1,5-pentanediol, neopentyl glycol, 3-methyl-1,5-pentanediol, 2,4-diethyl-1,5-pentanediol, 1,6-hexanediol, 2-ethyl-1,3-hexanediol, and alkane (having 7 to 10 carbon atoms) diols; alkene (having 4 to 10 carbon atoms) diols including 1,4-dihydroxy-2-butene, and 2,6-dimethyl-1-octene-3,8-diol; alicyclic diols (having 6 to 10 carbon atoms) such as cyclohexanedimethanol; aromatic diols (aromatic ring-containing diol having 6 to 10 carbon atoms) such as xylene glycol; and diols (having 2 to 10 carbon atoms) of oxyalkylene alcohol including diethylene glycol, trioxyethylene glycol, tetraoxyethylene glycol, dipropylene glycol, and trioxypropylene glycol.

Examples of the triol having 3 to 10 carbon atoms include triols such as aliphatic triol having 3 to 6 carbon atoms including glycerin, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol, and other aliphatic triols (having 7 to 10 carbon atoms).

Examples of the tetraol having 5 to 10 carbon atoms include tetraols such as tetramethylolmethane, and diglycerin.

Examples of the low-molecular-weight polyol also include polyalkylene oxide having a number average molecular weight of 400) or less. Examples of such polyalkylene oxide include polyethylene glycol (polyoxyethyleneetherglycol), polypropylene glycol (polyoxypropyleneetherglycol), and polyethylene polypropylene glycol (random or block copolymer) produced by addition reaction of alkylene oxide such as ethylene oxide and/or propylene oxide using the above-described low-molecular-weight polyol (diol, triol, etc.) as an initiator.

The low-molecular-weight polyol can be used singly, or can be used in combination of two or more.

Preferably, triol is at least used, and to be specific, triol having 3 to 10 carbon atoms is used singly, or triol having 3 to 10 carbon atoms and diol having 2 to 10 carbon atoms are used in combination.

The low-molecular-weight polyol is blended in an amount of, relative to 100 parts by mass of the high-molecular weight polyol, for example, 0.1 to 30 parts by mass, preferably 0.5 to 25 parts by mass.

When the triol having 3 to 10 carbon atoms is used singly, for example, 10 parts by mass or less, preferably 9 parts by mass or less, more preferably 0.5 to 6 parts by mass of the triol having 3 to 10 carbon atoms is blended relative to 100 parts by mass of the high-molecular weight polyol.

When the triol having 3 to 10 carbon atoms is blended in more than the above-described range, the photoelastic polyurethane resin becomes non-transparent, light may not pass the photoelastic polyurethane resin, and the Young's modulus of the photoelastic polyurethane resin may become excessively high.

When the triol having 3 to 10 carbon atoms and the diol having 2 to 10 carbon atoms are used in combination, the triol having 3 to 10 carbon atoms is blended in an amount of, relative to 100 parts by mass of the high-molecular weight polyol, for example, 0.5 to 10 parts by mass, preferably 0.6 to 6 parts by mass, and the diol having 2 to 10 carbon atoms is blended in an amount of, relative to 100 parts by mass of the high-molecular weight polyol, for example, 25 parts by mass or less, preferably 0.1 to 10 parts by mass. When the triol having 3 to 10 carbon atoms and the diol having 2 to 10 carbon atoms are blended within the above-described range, high photoelasticity and high rigidity can be achieved both.

When the triol having 3 to 10 carbon atoms and the diol having 2 to 10 carbon atoms are used in combination, they are blended in total of, relative to 10) parts by mass of the high-molecular weight polyol, for example, 0.1 to 30 parts by mass, preferably 0.5 to 25 parts by mass, more preferably 0.7 to 6 parts by mass.

When the total amount of the triol and the diol is less than the above-described range, the Young's modulus may be excessively reduced, moldability and scratch resistance may be reduced, and the photoelastic constant may be reduced. When the total amount of the triol and the diol is more than the above-described range, the Young's modulus may be excessively high.

The active hydrogen group-containing component is blended so that the high-molecular weight polyol in the active hydrogen group-containing component relative to 100 parts by mass of the polyisocyanate component is, for example, 120 to 400 parts by mass, preferably 125 to 333 parts by mass.

In other words, the polyisocyanate component content relative to 100 parts by mass of the high-molecular weight polyol is, for example, 25 to 85 parts by mass, preferably 30 to 80 parts by mass. When the polyisocyanate component content is within the above-described range, high rigidity can be achieved.

When the polyisocyanate component content is more than the above-described range, the Young's modulus is excessively high, and the desired photoelastic constant may not be achieved in the photoelastic polyurethane resin.

When the polyisocyanate component content is less than the above-described range, the desired photoelastic constant may not be achieved in the photoelastic polyurethane resin.

The polyurethane resin composition of the present invention can contain a plasticizer.

The plasticizer is blended in the polyurethane resin composition as necessary to reduce the glass transition temperature of the photoelastic polyurethane resin, and examples thereof include a cyano compound, phthalic acid ester (for example, phthalic acid di-2-ethylhexyl, phthalic acid diisononyl (DINP)), adipic acid ester (for example, adipic acid dioctyl), sebacic acid ester (for example, sebacic acid dioctyl), phosphoric acid triglycidyl, acetylcitric acid tributyl, epoxidized soybean oil, trimellitic acidtrioctyl, alkylbenzene, alkylbiphenyl (for example, 4-pentylbiphenyl), chlorinated paraffin, a high boiling point solvent, ion liquid (for example, 1-ethyl-2,3-dimethylimidazolium bis(trifluoromethanesulfonyl) imide), and a polyester plasticizer. Preferably, a cyano compound is used.

When the cyano compound is blended in the polyurethane resin composition, the Young's modulus of the molded article can be reduced, and with the reduced Young's modulus, processability of the photoelastic polyurethane resin can be improved, and the photoelastic constant can also be increased.

The cyano compound has, for example, 14 to 24 carbon atoms, and a 4-cyanophenyl group (where a portion of hydrogen atoms in 4-cyanophenyl group may be replaced with fluorine atoms).

When the cyano compound has the 4-cyanophenyl group, the photoelastic constant can be increased even more.

In the 4-cyanophenyl group, for example, the hydrogen atoms at positions 2 to 6 are replaced with the fluorine atoms, preferably, the hydrogen atom at position 2 is replaced with the fluorine atom.

Examples of the cyano compound include, to be specific, a biphenyl compound represented by formula (1) below:

[Chemical Formula 1]

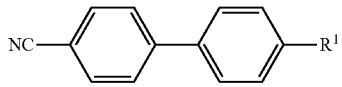

(1)

(where R1 is an alkyl group having 1 to 11 carbon atoms, a 4-alkylphenyl group having 7 to 11 carbon atoms, or a 4-alkylcyclohexyl group having 7 to 11 carbon atoms), an ether compound represented by formula (2) below,

[Chemical Formula 2]

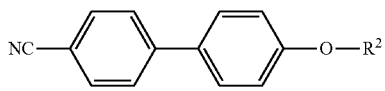

(2)

(where R2 represents an alkyl group having 1 to 11 carbon atoms), a cyclohexyl compound represented by formula (3) below,

[Chemical Formula 3]

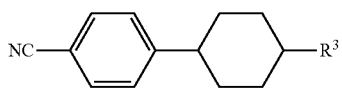

(3)

(R3 represents an alkyl group having 1 to 11 carbon atoms, or an alkenyl group having 5 to 11 carbon atoms), and a phenyl ester compound represented by formula (4) below,

[Chemical Formula 4]

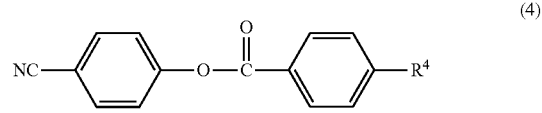

(4)

(R4 represents a hydrogen atom or an alkyl group having 1 to 10 carbon atoms).

In the above-described formula (1), examples of the alkyl group having 1 to 11 carbon atoms represented by R1 include a straight chain or branched alkyl group such as methyl, ethyl, propyl, isopropyl, butyl, isobutyl, tert-butyl, pentyl, isopentyl, tert-pentyl, hexyl, heptyl, octyl, nonyl, isononyl, decyl, and dodecyl. Preferably, an alkyl group having 2 to 7 carbon atoms is used.

In the above-described formula (1), examples of the 4-alkylphenyl group having 7 to 11 carbon atoms represented by R1 include a 4-alkylphenyl group having a straight chain or branched alkyl moiety with 1 to 5 carbon atoms such as 4-methylphenyl, 4-ethylphenyl, 4-propylphenyl, 4-isopropylphenyl, 4-pentylphenyl, 4-isopentylphenyl, and 4-tertpentylphenyl. Preferably, a 4-alkylphenyl group having 9 to 11 carbon atoms with an alkyl moiety with 3 to 5 carbon atoms is used.

Examples of the 4-alkylcyclohexyl group having 7 to 11 carbon atoms include a 4-alkylcyclohexyl group having a straight chain or branched alkyl moiety with 1 to 5 carbon atoms such as 4-methylcyclohexyl, 4-ethylcyclohexyl, 4-propylcyclohexyl, 4-isopropylcyclohexyl, 4-pentylcyclohexyl, 4-isopentylcyclohexyl, and 4-tertpentylcyclohexyl. Preferably, a 4-alkylcyclohexyl group having 9 to 11 carbon atoms with an alkyl moiety having 3 to 5 carbon atoms is used.

For R1 represented by the above-described formula (1), preferably an alkyl group having 1 to 11 carbon atoms, and a 4-alkylcyclohexyl group having 7 to 11 carbon atoms are used.

For the biphenyl compound represented by the above-described formula (1), to be specific, 4-cyano-4'-methylbiphenyl, 4-cyano-4'-pentylbiphenyl, and 4-cyano-4'-(4-pentylcyclohexyl) biphenyl are used.

In the above-described formula (2), examples of the alkyl group having 1 to 11 carbon atoms represented by R2 include the alkyl groups given as examples of alkyl group having 1 to 11 carbon atoms represented by R1 in the above-described formula (1).

Examples of the ether compound represented by the above-described formula (2) include, to be specific, 4-cyano-4'-pentyloxybiphenyl.

In the above-described formula (3), examples of the alkyl group having 1 to 11 carbon atoms represented by R3 include the alkyl group having 1 to 11 carbon atoms represented by R1 in the above-described formula (1).

In the above-described formula (3), examples of the alkenyl group having 5 to 11 carbon atoms represented by R3 include pentenyl, hexenyl, heptenyl, octenyl, nonenyl, decynyl, and dodecenyl.

In the above-described formula (3), for R3, preferably, an alkyl group having 1 to 11 carbon atoms is used.

Examples of the cyclohexyl compound represented by the above-described formula (3) include, to be specific, 4-(4- pentylcyclohexyl) benzonitrile, 4-((3-pentenyl)-4-cyclohexyl) benzonitrile, and 2-fluoro-4-(4-pentylcyclohexyl) benzonitrile.

In the above-described formula (4), examples of the alkyl group having 1 to 10 carbon atoms represented by R4 include, of the alkyl groups given as examples of the alkyl group having 1 to 11 carbon atoms represented by R1 in the above-described formula (1), the alkyl groups of the alkyl group having 1 to 10 carbon atoms are used.

Examples of the phenylester compound represented by the above-described formula (4) include 4-propylbenzoic acid 4-cyanophenyl, 4-heptylbenzoic acid 4-cyanophenyl, and 4-pentylbenzoic acid 4-cyano-3,5-difluorophenyl.

Examples of the cyano compound also include cyanobenzene and 4-methoxybenzene.

The cyano compound can be used singly, or can be used in combination of two or more.

Of the cyano compound, preferably, a biphenyl compound is used.

The plasticizer is blended in an amount of, relative to 100 parts by mass of the high-molecular weight polyol, for example, 100 parts by mass or less, preferably 1 to 60 parts by mass, more preferably 5 to 30 parts by mass.

When the plasticizer is blended in more than the above-described range, the Young's modulus of the photoelastic polyurethane resin may be excessively reduced, and appearance of the photoelastic polyurethane resin may be non-transparent.

By formulating (blending) the above-described polyisocyanate component and the active hydrogen group-containing component, and as necessary the plasticizer, a polyurethane resin composition is produced.

A preferable combination of the components blended in the polyurethane resin composition include, for example, a combination of aromatic ring-containing polyisocyanate containing a 1,4-phenylene group, polyetherpolyol, and triol having 3 to 10 carbon atoms. To be specific, the combination can be benzene ring-containing diisocyanate, polytetramethylene ether polyol, and aliphatic triol having 3 to 6 carbon atoms, preferably, a combination of benzene ring-containing diisocyanate, polytetramethylene ether polyol, and aliphatic triol having 3 to 6 carbon atoms.

A preferable combination of the components formulated in the polyurethane resin composition also include, for example, a combination of aromatic ring-containing polyisocyanate containing a 1,4-phenylene group, polyetherpolyol, diol having 2 to 10 carbon atoms, and triol having 3 to 10 carbon atoms. To be specific, the combination can be benzene ring-containing diisocyanate, polytetramethylene ether polyol, aliphatic diol having 2 to 10 carbon atoms, and aliphatic triol having 3 to 6 carbon atoms.

A preferable combination of the components formulated in the polyurethane resin composition also include, for example, various types of aromatic ring-containing polyisocyanates, polyetherpolyol, diol having 2 to 10 carbon atoms, and triol having 3 to 10 carbon atoms. To be specific, the combination can be benzene ring-containing diisocyanate and naphthalene ring-containing diisocyanate, polytetramethylene ether polyol, aliphatic diol having 2 to 10 carbon atoms, and aliphatic triol having 3 to 6 carbon atoms, or a combination of two different benzene ring-containing diisocyanates, polytetramethylene ether polyol, aliphatic diol having 2 to 10 carbon atoms, and aliphatic triol having 3 to 6 carbon atoms.

A preferable combination of the components formulated in the polyurethane resin composition also include, for example, aromatic ring-containing polyisocyanate containing a 1,4-phenylene group, polyetherpolyol, diol having 2 to 10 carbon atoms, triol having 3 to 10 carbon atoms, and a plasticizer. To be specific, the combination can be benzene ring-containing diisocyanate, polytetramethylene ether polyol, aliphatic diol having 2 to 10 carbon atoms, aliphatic triol having 3 to 6 carbon atoms, and a biphenyl compound.

A preferable combination of the components formulated in the polyurethane resin composition also include, for example, aromatic ring-containing polyisocyanate containing a 1,4-phenylene group, polycarbonatepolyol, triol having 3 to 10 carbon atoms, and a plasticizer. To be specific, the combination can be benzene ring-containing diisocyanate, polycarbonatediol, aliphatic triol having 3 to 6 carbon atoms, and a biphenyl compound.

A preferable combination of the components formulated in the polyurethane resin composition also include, for example, a plurality of types of the aromatic ring-containing polyisocyanate containing a 1,4-phenylene group, polyetherpolyol, diol having 2 to 10 carbon atoms, triol having 3 to 10 carbon atoms, and a plasticizer. To be specific, the combination can be two different types of benzene ring-containing diisocyanates, polytetramethylene ether polyol, aliphatic diol having 2 to 10 carbon atoms, aliphatic triol having 3 to 6 carbon atoms, and a biphenyl compound or an ether compound.

A preferable combination of the components formulated in the polyurethane resin composition also include, for example, various types of aromatic ring-containing polyisocyanates, polycarbonatepolyol, and triol having 3 to 10 carbon atoms. To be specific, the combination can be benzene ring-containing diisocyanate and naphthalene ring-containing diisocyanate, polycarbonatediol, and aliphatic triol having 3 to 10 carbon atoms.

A preferable combination of the components formulated in the polyurethane resin composition also include, for example, aromatic ring-containing polyisocyanate containing a 1,4-phenylene group, polyesterpolyol, and triol having 3 to 10 carbon atoms. To be specific, the combination can be benzene ring-containing polyisocyanate, polyesterdiol of polycondensate of dicarboxylic acid and diol, and aliphatic triol having 3 to 10 carbon atoms.

The photoelastic polyurethane resin can be produced by allowing polyisocyanate and polyol to react with each other from the polyurethane resin composition, and curing and molding the polyurethane resin composition.

The reaction of the polyisocyanate component and the active hydrogen group-containing component can be performed in accordance with, for example, a known molding method such as one shot process and prepolymer process.

In the one shot process, for example, the polyisocyanate component and the active hydrogen group-containing component are formulated (mixed) so that the isocyanate index (ratio of the isocyanate group concentration relative to the hydroxyl group concentration multiplied by 100, NCO concentration/hydroxyl group concentration×100) is, for example, 70 to 400, preferably 80 to 150, and then the mixture is injected into a mold, and curing reaction is conducted at, for example, 0° C. to 250° C., preferably room temperature (20° C.) to 150° C., for, for example, 1 minute to 7 days, preferably for 10 minutes to 2 days.

When 4,4'-MDI and TODI are used in combination as the polyisocyanate component, to allow the polyisocyanate component to react with the active hydrogen group-containing component, first, the high-molecular weight polyol is allowed to react with TODI to obtain a reaction product (hydroxyl group-terminal) of the high-molecular weight polyol and TODI. At this time, the isocyanate index of the high-molecular weight polyol and TODI is, for example, 1 or more, and for example, less than 100, preferably 50 or less.

Then, a low-molecular-weight polyol is blended to the reaction product (hydroxyl group-terminal) of the high-molecular weight polyol and TODI to formulate (mix) the reaction product (hydroxyl group-terminated) of the high-molecular weight polyol and TODI, and the low-molecular-weight polyol and 4,4'-MDI. At this time, the isocyanate index of the reaction product (hydroxyl group-terminal) of the high-molecular weight polyol and TODI, and the low-molecular-weight polyol and 4,4'-MDI is, for example, more than 100, preferably 100.1 or more, and for example, 110 or less.

In the curing reaction, a urethanizing catalyst can be added. Examples of the urethanizing catalyst include a tin catalyst (for example, tin octylate, etc.), lead catalyst (for example, lead octylare, etc.), bismuth catalyst, titanium catalyst, zirconium catalyst, organic metal catalyst, and amine catalyst, and preferably, in view of achieving a high photoelastic constant, a lead catalyst is used.

The urethanizing catalyst is blended in an amount of, relative to 100 parts by mass of the polyisocyanate component, for example, 0.0001 to 2.0 parts by mass, preferably 0.0005 to 1.0 parts by mass.

The above-described curing reaction can also be conducted in the presence of a known solvent.

The photoelastic polyurethane resin molded into a predetermined shape can be produced by, after injecting into the mold and subjecting it to curing reaction, removing from the mold.

Alternatively, the photoelastic polyurethane resin having a predetermined thickness can be formed by applying the polyurethane resin composition on a substrate such as, for example, a glass substrate, and a resin film with a uniform thickness to form a film, and then curing.

The photoelastic polyurethane resin can be released from the substrate after curing. Alternatively, the photoelastic polyurethane resin can be used while it is attached to the substrate without releasing it from the substrate.

In the prepolymer, for example, first, the polyisocyanate component is allowed to react with a portion of the active hydrogen group-containing component (for example, high-molecular weight polyol), to synthesize an isocyanate group-terminated prepolymer having an isocyanate group at its molecular terminal. Then, the produced isocyanate group-terminated prepolymer is allowed to react with the remaining portion of the active hydrogen group-containing component (chain extender; for example, low-molecular-weight polyol (and as necessary high-molecular weight polyol, monol))(chain extension), and subjected to curing reaction.

The isocyanate group-terminated prepolymer is synthesized in the following manner. The polyisocyanate component and a portion of the active hydrogen group-containing component is formulated (mixed) such that the isocyanate index (NCO concentration/hydroxyl group concentration× 100) is, for example, 110 to 2,000, preferably 150 to 1,000, and the mixture is allowed to react in a reaction vessel at, for example, room temperature to 150° C., preferably 40 to 120° C., for, for example, 0.5 to 18 hours, preferably 2 to 10 hours.

The above-described isocyanate group-terminated prepolymer can be synthesized in the presence of a known solvent.

After synthesis of the above-described isocyanate group-terminated prepolymer, the solvent or the unreacted polyisocyanate component can be removed by the removal methods including, for example, distillation such as thin film distillation, and extraction such as liquid-liquid extraction.

The produced isocyanate group-terminated prepolymer has an isocyanate equivalent of, for example, 80 to 2,000, preferably 100 to 1,000.

Then, to allow the produced isocyanate group-terminated prepolymer to react with the remaining portion of the active hydrogen group-containing component, the isocyanate group-terminated prepolymer and the remaining portion of the active hydrogen group-containing component are formulated (mixed) such that the isocyanate index (NCO concentration/hydroxyl group concentration×100) is, for example, 50 to 200, preferably 75 to 125, and then the mixture is injected into a mold, and curing reaction is conducted at, for example, 0 to 250° C., preferably room temperature (20° C.) to 150° C. for, for example, 1 minute to 7 days, preferably for 10 minutes to 2 days.

In the curing reaction as well, the above-described urethanizing catalyst can be added at the above-described blending ratio. The curing reaction can be conducted in the presence of a known solvent.

The photoelastic polyurethane resin molded into a predetermined shape can be produced by, after injecting into the mold and subjecting it to curing reaction, releasing from the mold.

The photoelastic polyurethane resin can cause birefringence to light (for example, laser light, etc.) passing through inside the molded article based on photoelasticity, that is, generation of a stress. Therefore, the photoelastic polyurethane resin can be suitably used as the sensor 1.

To the above-described polyurethane resin composition or photoelastic polyurethane resin, as necessary, for example, a known additive such as an antifoaming agent, plasticizer, leveling agent, delusterant, fire retardant, thixotropic agent, tackifier, thickening agent, lubricant, antistatic agent, surfactant, reaction retardant, dehydration agent, antioxidant, ultraviolet ray absorber, hydrolysis prevention agent, and weathering stabilizer can be suitably added.

The photoelastic polyurethane resin has a photoelastic constant at 25° C. of, for example, $1000 \times 10^{-12}$ $Pa^{-1}$ or more, preferably, $2000 \times 10^{-12}$ $Pa^{-1}$ or more, more preferably, $3000 \times 10^{-12}$ $Pa^{-1}$ or more, even more preferably, $3500 \times 10^{-12}$ $Pa^{-1}$ or more, more preferably, $4000 \times 10^{-12}$ $Pa^{-1}$ or more, and for example, $100000 \times 10^{-12}$ $Pa^{-1}$ or less, preferably, $10000 \times 10^{-12}$ $Pa^{-1}$ or less, more preferably $6000 \times 10^{-12}$ $Pa^{-1}$ or less, even more preferably, $5500 \times 10^{-12}$ $Pa^{-1}$ or less.

When the photoelastic constant is more than the above-described lower limit, excellent photoelasticity can be ensured.

The photoelastic constant of the photoelastic polyurethane resin can be measured in accordance with the description of "photoelastic constant measurement method" in "development of a system for measuring the photoelastic constants of optical films" in Journal of The Japan Society for Precision Engineering vol. 73, 253-258 (2007) by Mitsuo Tuskiji, Hiroyuki Takada, and Yoshiro Tajitsu.

Along with the measurement of the photoelastic constant, the distortion optical constant and the Young's modulus of the photoelastic polyurethane resin can be determined.

The distortion optical constant of the photoelastic polyurethane resin shows the intensity of birefringence generated by the deformation relative to the amount of deformation of the photoelastic resin.

The photoelastic constant, distortion optical constant, and Young's modulus satisfy formula (5) below:

Photoelastic constant=distortion optical constant÷Young's modulus    (5)

Thus, to set the photoelastic constant of the photoelastic polyurethane resin to the above-described desired range, the distortion optical constant and Young's modulus are adjusted.

To be specific, the higher the distortion optical constant, and the lower the Young's modulus, the higher the photoelastic constant, but when the Young's modulus is excessively low, moldability may be reduced.

Therefore, the photoelastic polyurethane resin has a Young's modulus at 25° C. of, for example, 2 MPa or more, preferably, 3 MPa or more, and for example, 5 MPa or less.

When the photoelastic polyurethane resin has a Young's modulus of less than the above-described range, the photoelastic polyurethane resin may be excessively soft and easily get damaged, processability may be reduced. When the photoelastic polyurethane resin has a Young's modulus of more than the above-described range, the photoelastic polyurethane resin may be excessively hard, and photoelasticity may be reduced.

Preferably, to obtain the above-described desired photoelastic constant, when the photoelastic polyurethane resin has a Young's modulus at 25° C. of 2 MPa or more and 3 MPa or less, the distortion optical constant at 25° C. is, for example, $6000 \times 10^{-6}$ or more (generally $10000 \times 10^{-6}$ or less), and when the photoelastic polyurethane resin has a Young's modulus at 25° C. of more than 3 MPa and 5 MPa or less, the distortion optical constant at 25° C. is, for example, $10000 \times 10^{-6}$ or more (generally $20000 \times 10^{-6}$ or less).

The photoelastic polyurethane resin has a glass transition temperature of, for example, −60° C. or more, preferably −40° C. or more, more preferably, −35° C. or more, even more preferably, −30° C. or more, and for example, −21° C. or less, preferably, −25° C. or less.

When the photoelastic polyurethane resin has a glass transition temperature of less than the above-described lower limit, workability and scratch resistance of the photoelastic polyurethane resin may be reduced.

When the photoelastic polyurethane resin has a glass transition temperature of the above-described upper limit or more, it becomes difficult to obtain the above-described desired photoelastic constant.

The glass transition temperature of the photoelastic polyurethane resin can be obtained by using a dynamic viscoelasticity measuring apparatus with a frequency of 10 Hz and under a temperature distribution mode (temperature increase rate 5° C./min).

With the above-described glass transition temperature measurement, the storage modulus E', loss modulus E", and loss tangent tan δ can be obtained at the same time.

The photoelastic polyurethane resin has a storage modulus E' at 25° C. of, for example, $1 \times 10^6$ to $1 \times 10^8$ Pa, a loss modulus E" at 25° C. of, for example, $1 \times 10^4$ to $1 \times 10^8$ Pa, and a loss tangent at 25° C. tan δ of, for example, 0.01 to 0.2.

When the photoelastic polyurethane resin has a glass transition temperature of the above-described upper limit or more, the response time of the sensor (sensor 1 to be described later, etc.) under low temperature may be longer (response speed is slow).

The sensor has a response time of, preferably, within 10 milliseconds. When the sensor has a response time within the above-described range, collision of the vacuuming robot to be described later with obstruction can be reliably detected.

The sensor is used under an environment with a temperature of, for example, −10° C. or more, and for example, 40° C. or less.

When the temperature of the environment under which the sensor is used decreases and the temperature of the environment under which the sensor is used approximates to the glass transition temperature of the photoelastic polyurethane resin, the loss modulus E" of the photoelastic polyurethane resin may increase and the response speed to the external force tends to be slow.

When the photoelastic polyurethane resin has a glass transition temperature of the above-described upper limit or more, even if the temperature of the environment for use is −10° C., the response speed to the external force can be ensured, and collision of the vacuuming robot to be described later with obstruction can be detected quickly.

The response speed of the sensor can be evaluated by measuring the frequency dependence of the photoelastic constant. When the temperature of the environment under which the sensor is used decreases and the loss modulus E" of the photoelastic polyurethane resin increases, in the frequency range of 0.1 Hz to 100 Hz, the photoelastic constant decreases as the frequency increases. When the photoelastic constant is small in the high frequency region, the response speed of the sensor slows. For example, to obtain sufficient response speed of the sensor when the temperature of the environment for use is −10° C., it is preferable that the photoelastic constant is constant with the frequency range of 0.1 Hz to 100 Hz even if the temperature is −10° C. When the photoelastic constant is constant till the frequency of 100 Hz (cycle of 10 msec), the response time is assumed to be less than 10 msec.

As described above, the photoelastic polyurethane of the present invention is expected to have a quick response speed and a wide temperature range for use, and therefore as described later, it is suitably used for detection members and sensors, especially for a material for a pressure-sensitive sensor. Furthermore, such a detection member is, as described below, used suitably for a component of a robot.

In the following, configuration of a sensor 1 as a first embodiment of the detection member of the present invention is described with reference to FIG. 1.

The sensor 1 is formed into a bar shape (for example, cylindrical bar, elliptic cylindrical bar, prism, etc.) extending in one direction (right direction on the plane of paper in FIG. 1) and the other direction (left direction on the plane of paper in FIG. 1). The sensor 1 includes a resin member 2, a light generating unit 3, a light receiving unit 4, and a cover 5.

The resin member 2 is disposed inside the sensor 1. The resin member 2 is formed into a bar shape (for example, cylindrical bar, elliptic cylindrical bar, prism, etc.) extending in longitudinal direction (that is, one side and the other side) of the sensor 1. The resin member 2 is made of the above-described photoelastic polyurethane resin. The resin member 2 is formed into a bar shape by, for example, a mold (casting mold) with a predetermined shape, or formed into a bar shape by cutting after removed from the mold.

The light generating unit 3 is disposed at one end portion of the sensor 1. The light generating unit 3 includes a cap member 3A, a LED 3B as an example of the light generating member, and wiring 3C.

The cap member 3A is formed into a generally cylindrical shape extending in longitudinal direction of the sensor 1. A depressed portion 3D is formed in the cap member 3A.

The depressed portion 3D is depressed to one side from the other side end face of the cap member 3A. The one side end portion of the resin member 2 is fitted inside the depressed portion 3D.

The LED 3B is embedded at the end face (inner face on one side) of the depressed portion 3D. The LED 3B is disposed to face one end face of the resin member 2. This allows the light of the LED 3B to enter one side end face of the resin member 2. The position of the LED 3B, that is, the position facing the one side end face of the resin member 2, is an example of the first position.

The wiring 3C is electrically connected to the LED 3B.

The light receiving unit 4 includes a cap member 4A, a photodiode 4B as an example of the light receiving member, and wiring 4C.

The cap member 4A is formed into a generally cylindrical shape extending in longitudinal direction of the sensor 1. A depressed portion 4D is formed in the cap member 4A.

The depressed portion 4D is depressed to the other side from one side end face of the cap member 4A. The other side end portion of the resin member 2 is fitted inside the depressed portion 4D.

The photodiode 4B is embedded at the end face (inner face on the other side) of the depressed portion 4D. The photodiode 4B is disposed to face the other side end face of the resin member 2. This allows the photodiode 4B to receive the light that has passed through the resin member 2 from one side to the other side. The position of the photodiode 4B, that is, the position facing the other side end face of the resin member 2, is an example of the second position.

The wiring 4C is electrically connected to the photodiode 4B.

The cover 5 covers the resin member 2 between the light generating unit 3 and the light receiving unit 4. The cover 5 is formed into a generally cylindrical shape extending in longitudinal direction of the sensor 1. The resin member 2 is inserted inside the cover 5. The one side end face of the cover 5 is in contact with the cap member 3A of the light generating unit 3 at the peripheral portion of the depressed portion 3D. The other side end face of the cover 5 is in contact with the cap member 4A of the light receiving unit 4 at the peripheral portion of the depressed portion 4D. The cover 5 is composed, preferably, of resin with lower hardness than the resin member 2, for example, silicone resin, isoprene resin, butadiene resin, chloroprene resin, acrylic resin, and photoelastic polyurethane resin. The cover 5 can be colored, and can be transparent or semi-transparent.

In the following, use of the sensor 1 as a first embodiment of the present invention is described with reference to FIG. 2 to FIG. 8.

The sensor 1 can be used as a pressure-sensitive sensor.

Figure 2:
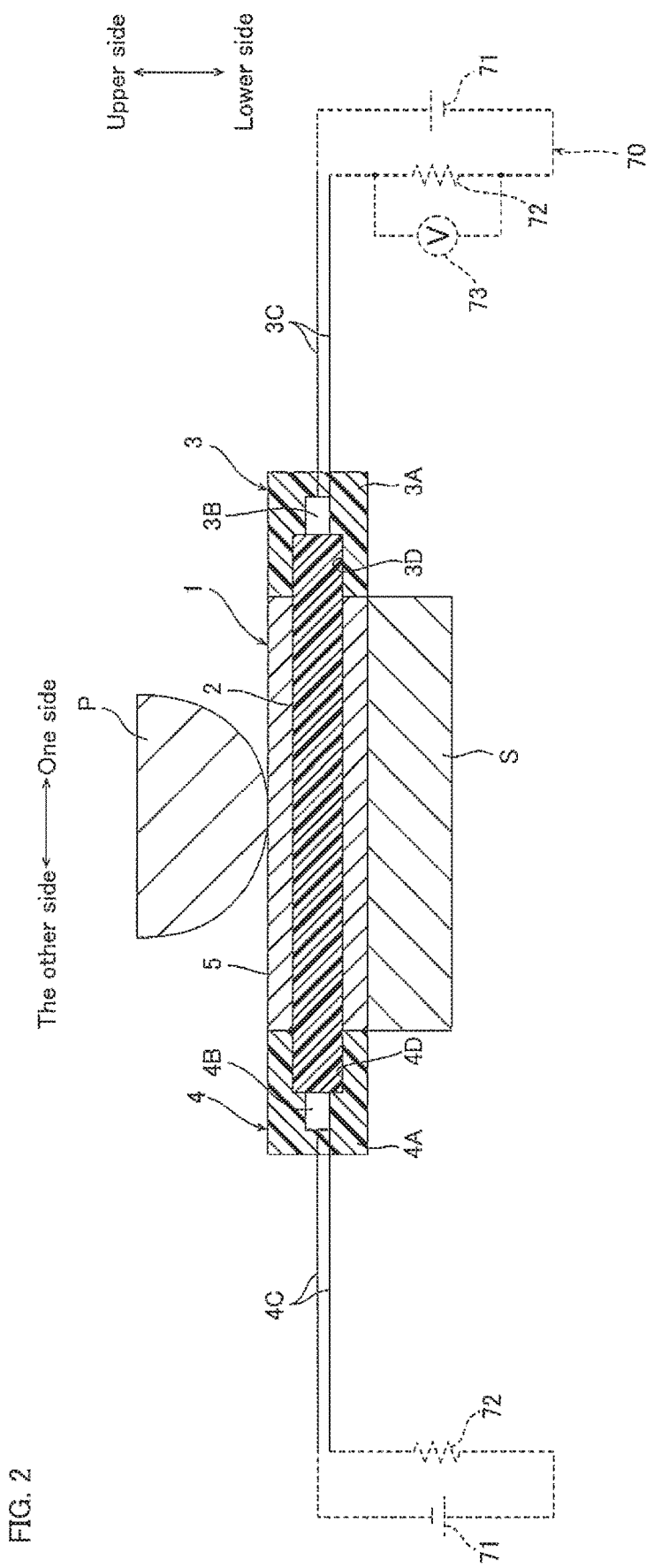
FIG. 2 is a figure illustrating pressure application on the sensor shown in FIG. 1.

For example, as shown in FIG. 2, the sensor 1 is placed on a flat support member S so that the cover 5 is in contact with the support member S. The sensor 1 is electrically connected to a control unit through the wiring 3C of the light generating unit 3 and the wiring 4C of the light receiving unit 4.

The pressing member P is in contact with a center portion in the longitudinal direction of the sensor 1. The pressing member P is curved so that its center portion in direction connecting one side and the other side bulges downward.

When a pressure from the pressing member P is not applied to the sensor 1, the resin member 2 of the sensor 1 is not pressurized, and is not deformed, and therefore no birefringence is caused. Therefore, the light from the LED 3B of the sensor 1 hardly attenuate, and is received by the photodiode 4B after passing through the resin member 2.

When the pressing member P presses downward the center in longitudinal direction of the sensor 1, the center portion in up-down direction of the resin member 2 of the sensor 1 is compressed (deformed) between the pressing member P and the support member S, and birefringence is caused. At this time, when the cover 5 is provided at the sensor 1, the cover 5 absorbs the pressures of the pressing member P to the resin member 2, and deformation of the resin member 2 is suppressed. This prevents birefringence in the resin member 2 to be caused from a small impact (for example, disturbance to the pressing member P, etc.).

Generation of birefringence at the center portion in up-down direction of the resin member 2 allows the light from the LED 3B of the sensor 1 to scatter at the center portion in up-down direction of the resin member 2, and the quantity of light received by the photodiode 4B after passing through the resin member 2 attenuates.

Then, from attenuation of the quantity of light received by the photodiode 4B, the pressure applied to the resin member 2 can be measured.

Figure 3:
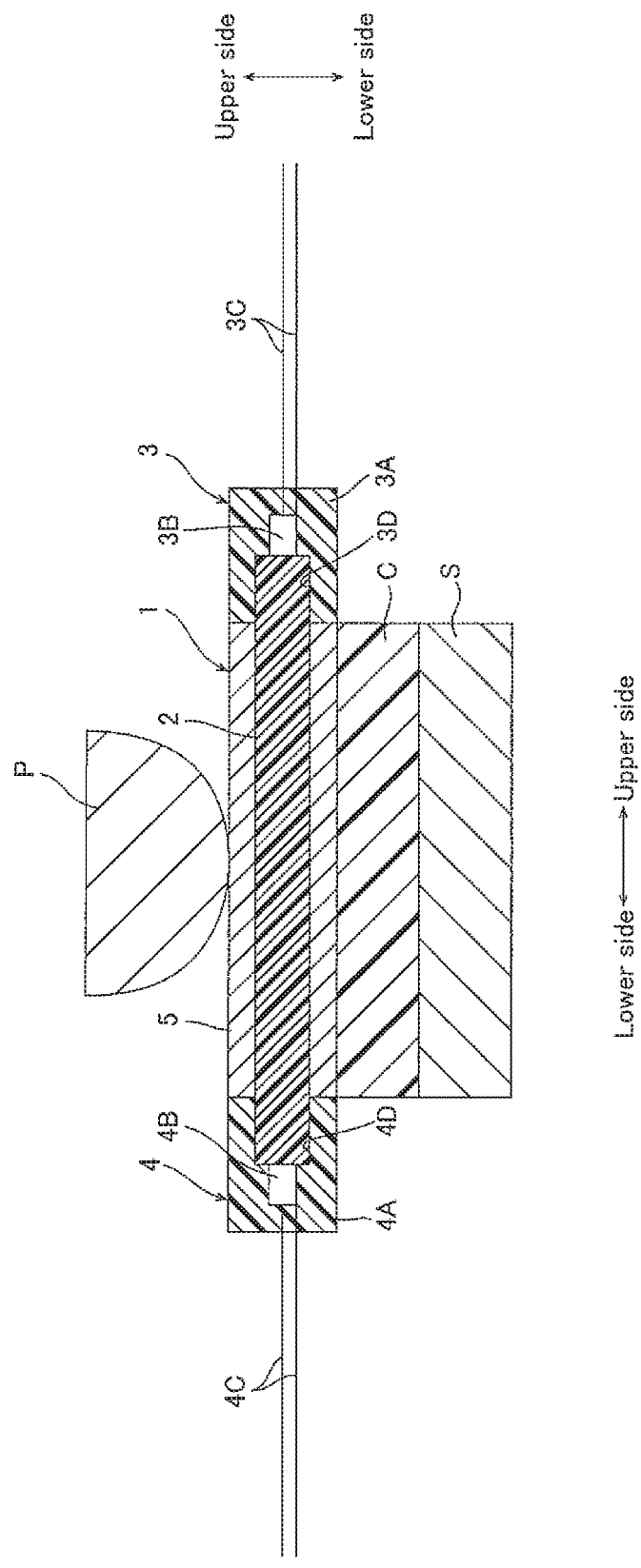
FIG. 3 is a figure illustrating an embodiment of a modified example in which the sensor shown in FIG. 1 includes a cushioning material.

As shown in FIG. 3, the sensor 1 may further include a cushioning material C.

The cushioning material C is laminated on the resin member 2 so as to be disposed between the resin member 2 and the support member S. The cushioning material C is composed of a material softer than the resin member 2, for example, foam such as polyurethane sponge.

When the cushioning material C is disposed between the resin member 2 and the support member S, the center portion in up-down direction of the resin member 2 can be flexed (curved) when the center portion in up-down direction of the resin member 2 is pressed with the pressing member P.

More significant birefringence can be caused at the center portion in up-down direction of the resin member 2 in this manner.

As a result, the pressing by the pressing member P to the resin member 2 can be detected more reliably.

Figure 4:
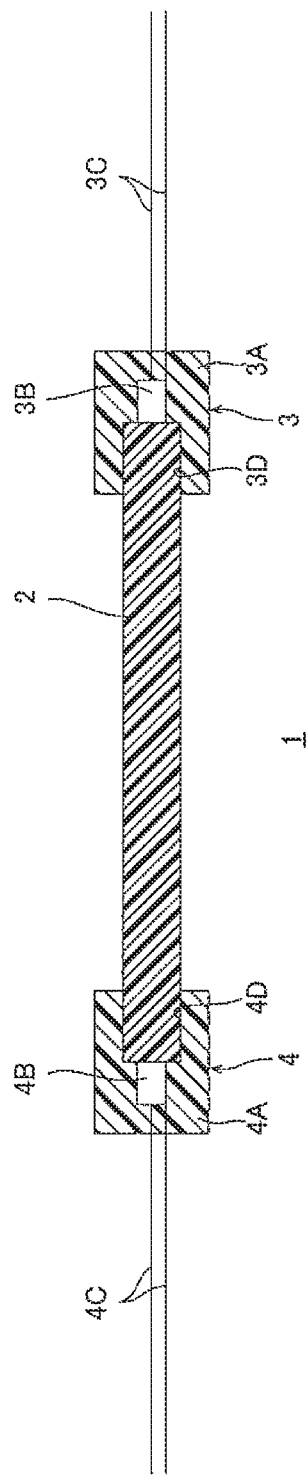
FIG. 4 is a figure illustrating an embodiment of a modified example in which the sensor shown in FIG. 1 includes no cover.
Figure 5:
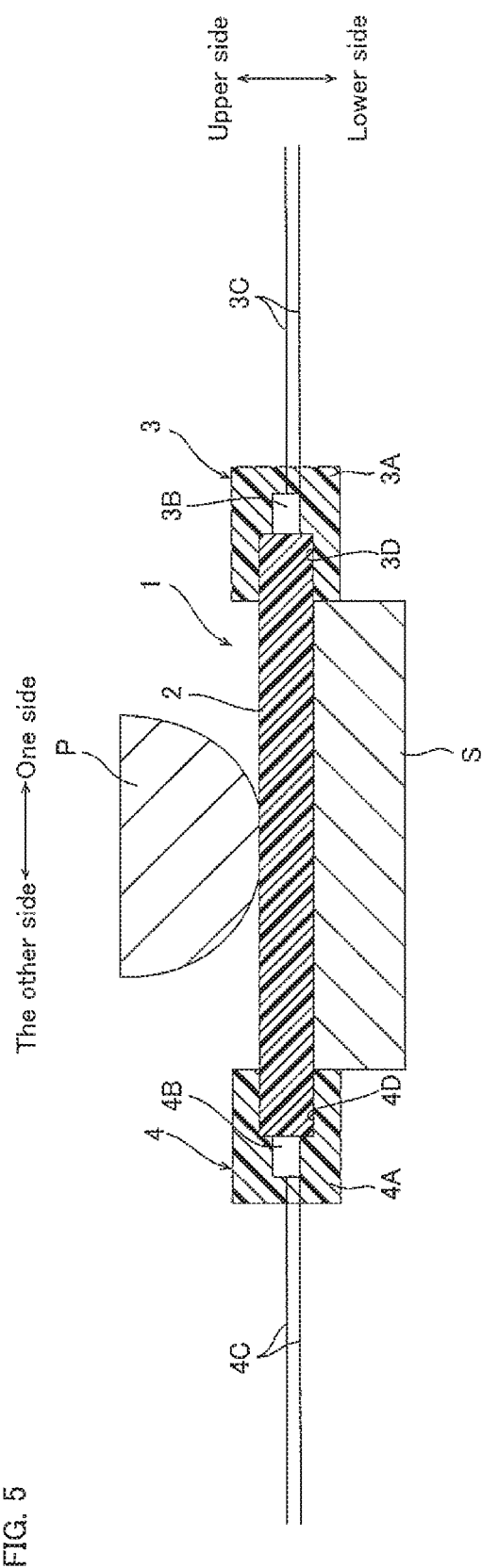
FIG. 5 is a figure illustrating pressure application on the sensor shown in FIG. 4.

As shown in FIG. 4 and FIG. 5, the sensor 1 can have no cover 5.

In this case, the pressing member P and the support member S are in direct contact with the resin member 2.

This allows more sensitive detection of the pressure application to the resin member 2 with the pressing member P.

Figure 6:
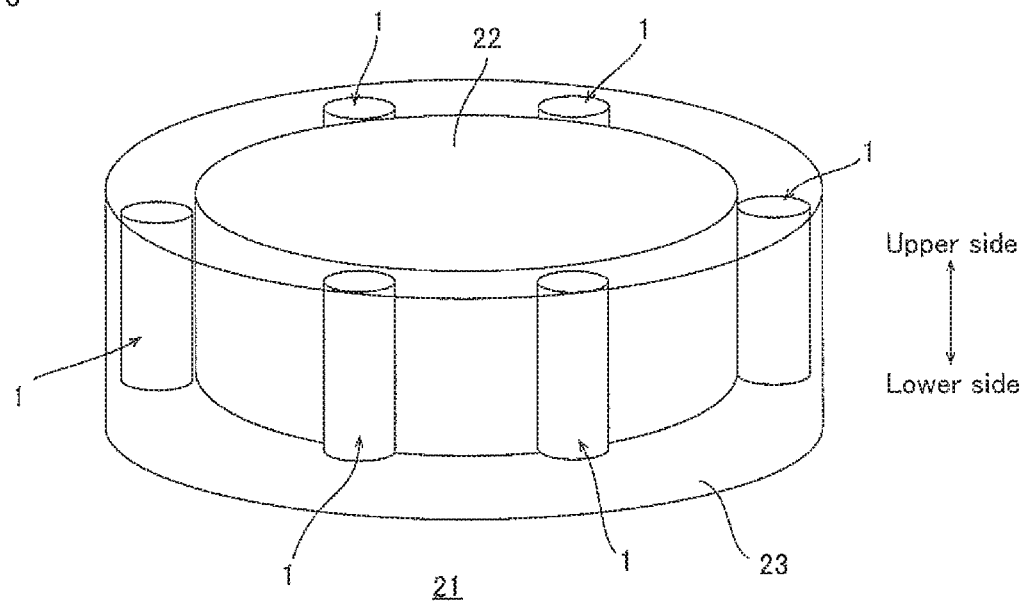
FIG. 6 is a schematic diagram illustrating a robot including the sensor shown in FIG. 1.
Figure 7:
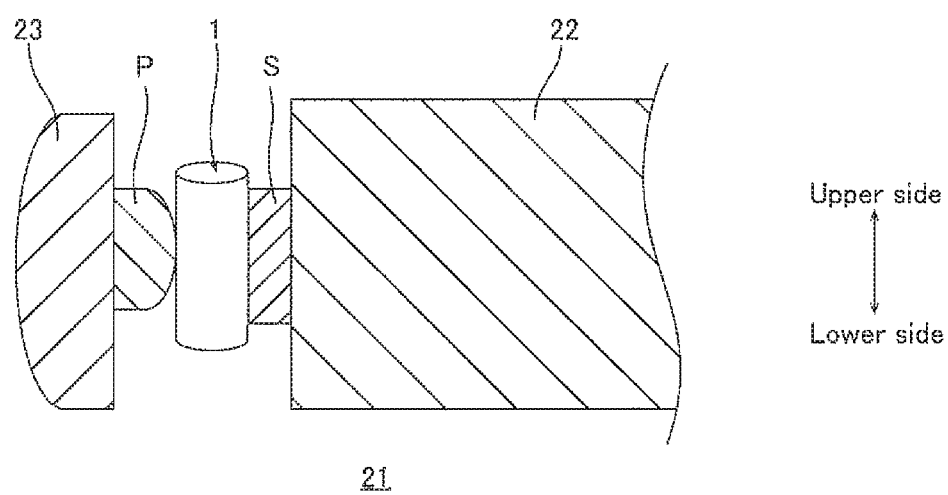
FIG. 7 is a figure illustrating contacts between the sensor shown in FIG. 6 and a pressing member of a bumper.

The sensor 1 can be used, as shown in FIG. 6 and FIG. 7, as a pressure-sensitive sensor of an autonomically drivable vacuuming robot 21 (an example of robot).

To be specific, the vacuuming robot 21 is formed into a generally disc shape having a thickness in up-down direction. The vacuuming robot 21 includes a main body 22, and a plurality of (6) sensors 1, and a bumper 23.

The main body 22 is disposed at a center in radial direction of the vacuuming robot 21. The main body 22 is formed into a generally disc shape having a thickness in up-down direction. The main body 22 includes, in its inside, a control unit that controls autonomous driving, which is not shown, as an example of a processor, a motor, which is not shown, a suction device, which is not shown, for vacuuming dust, and a reservoir unit that accumulates the sucked dust. The main body 22 has at its bottom portion, wheels, and a cleaning brush for scraping out the dust.

The plurality of sensors 1 are disposed in spaced apart relation from each other in circumferential direction at an outer side in radial direction of the main body 22. The sensors 1 are disposed, as shown in FIG. 7, so that their longitudinal direction is along up-down direction. The sensor 1 is fixed, with flat support member S, at an outer peripheral face of the main body 22. The sensor 1 is electrically connected to the control unit in the main body 22 through the wiring 3C of the light generating unit 3, and the wiring 4C of the light receiving unit 4. The number of the sensor 1 is not particularly limited, and for example, the number is 3 to 10.

The bumper 23 is disposed at an outer side in radial direction of the main body 22 so as to sandwich the sensor 1 between the main body 22 and the bumper 23. The bumper 23 is movable in a direction closer to the main body 22, and in a direction going away from the main body 22 in the radial direction of the main body 22. The bumper 23 includes a pressing member P.

The pressing member P is disposed at an inner face of the bumper 23. The inner face in radial direction of the pressing member P has a center portion in up-down direction curved so as to bulge inward in radial direction. The pressing member P is in contact with the center portion in up-down direction of the sensor 1 at the center portion in up-down direction of an inner face in radial direction.

Movement of the vacuuming robot 21 is described next.

The vacuuming robot 21 travels while cleaning the floor with the cleaning brush at the bottom portion by control from the control unit.

At this time, the resin member 2 of the sensor 1 is not pressurized, or deformed, and therefore no birefringence is caused. Therefore, the light from the LED 3B of the sensor 1 hardly attenuate, and passes through the resin member 2 and received by the photodiode 4B.

Then, the control unit of the vacuuming robot 21 determines that no collision with obstruction (room wall, etc.) is happening.

Then, when the bumper 23 collides with obstruction such as room wall, the pressing member P of the bumper 23 presses the center portion in up-down direction of the sensor 1.

Then, the center portion in up-down direction of the resin member 2 of the sensor 1 is decompressed (deformed) between the pressing member P and the support member S, and causes birefringence. At this time, if the sensor 1 is provided with the cover 5, the cover 5 absorbs the pressure to the resin member 2 with the pressing member P, and deformation of the resin member 2 is suppressed. This prevents generation of birefringence to the resin member 2 due to small impact (for example, disturbance while running, etc.).

Generation of birefringence at the center portion in up-down direction of the resin member 2 allows the light from the LED 3B of the sensor 1 to scatter at the center portion in up-down direction of the resin member 2, and the quantity of light received by the photodiode 4B after passing through the resin member 2 attenuates.

At this time, the control unit of the vacuuming robot 21 measures the pressure applied to the resin member 2 based on attenuation in quantity of light of received by the photodiode 4B.

Then, the control unit of the vacuuming robot 21 determines, when a pressure, that is, a predetermined pressure to the resin member 2, applied to the resin member 2 is detected, that collision to obstruction occurred. Then, the vacuuming robot 21 changes its direction to avoid obstruction with control of the control unit.

The vacuuming robot 21 cleans the floor in this manner so as to avoid the obstruction.

Figure 8:
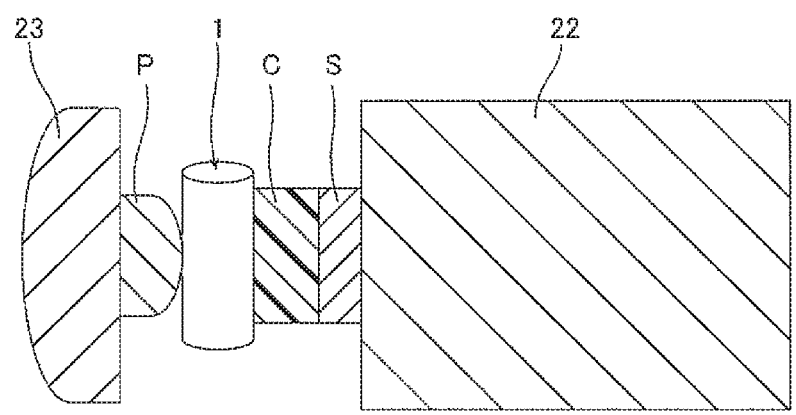
FIG. 8 is a figure illustrating an embodiment of a modified example in which a cushioning material is included for contact between the sensor shown in FIG. 7 and the pressing member of a bumper.

The vacuuming robot 21 can also include a sensor 1 (ref: FIG. 3) including a cushioning material C, as shown in FIG. 8.

Second Embodiment

In the following, a pressure-sensitive mat 31 as a second embodiment of the detection member of the present invention is described. In the second embodiment, the members that are the same as the above-described first embodiment are given the same reference numerals, and descriptions thereof are omitted.

Figure 9:
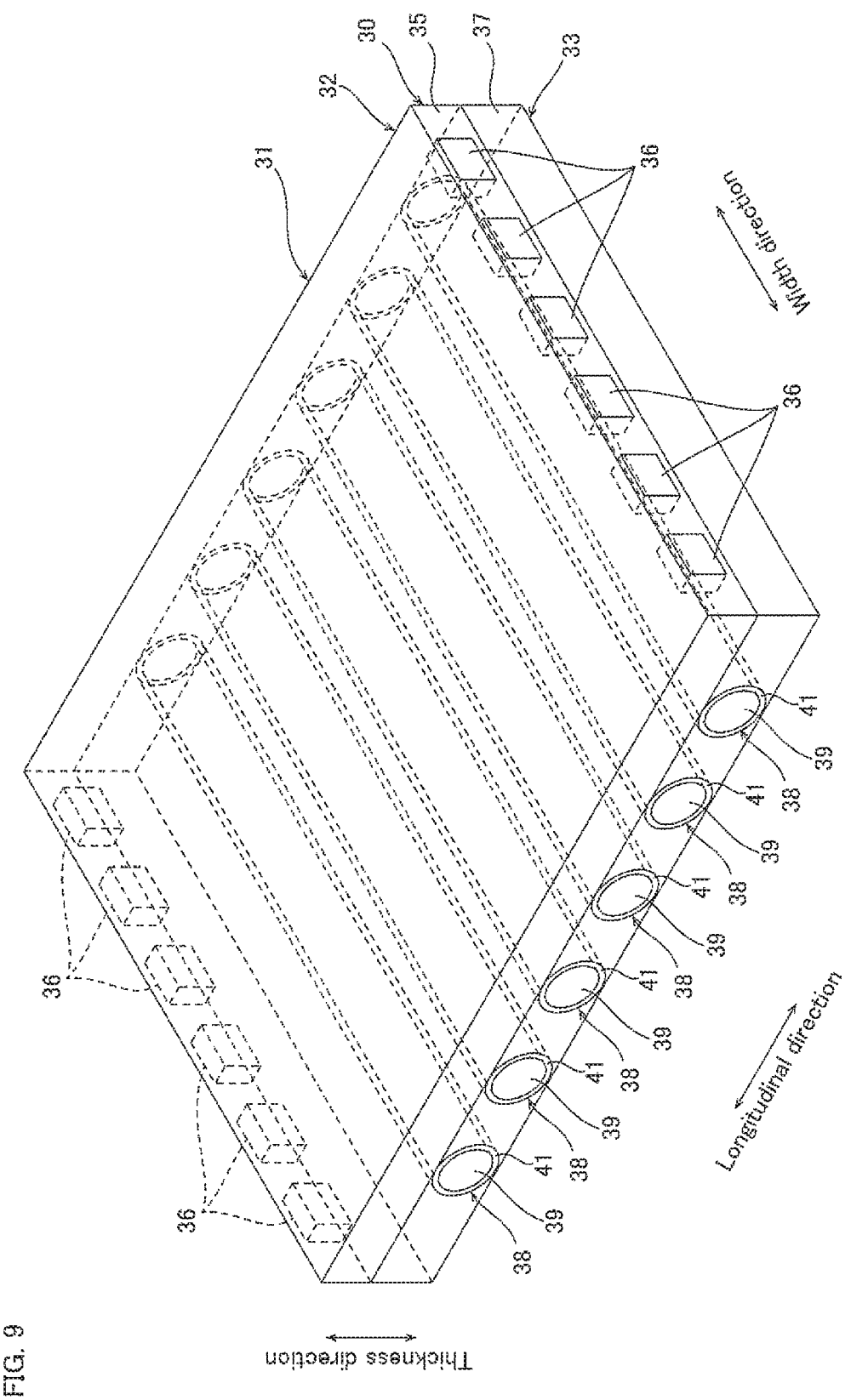
FIG. 9 is a perspective view illustrating a pressure-sensitive mat as a second embodiment of the detection member of the present invention.

In the second embodiment, as shown in FIG. 9, a pressure-sensitive mat 31 includes, a sheet sensor 30 including a LED 36 as an example of the light generating member, and a rod sensor 38 including photodiode as an example of the light receiving member.

To be specific, the pressure-sensitive mat 31 is formed into a rectangular shape when viewed in plan view having a thickness in up-down direction. The pressure-sensitive mat 31 includes a first layer 32, a second layer 33, and a cover layer 34.

The first layer 32 is disposed at an upper half of the pressure-sensitive mat 31. The first layer 32 includes a sheet sensor 30. The sheet sensor 30 includes a resin sheet 35, and a plurality of LEDs 36.

The resin sheet 35 is composed of the above-described photoelastic polyurethane resin, and is formed into a sheet shape having a rectangular shape when viewed in plan view extending in both longitudinal direction (in a direction perpendicular to the thickness direction of the pressure-sensitive mat 31) and the width direction (direction perpendicular to both thickness direction and longitudinal direction of the pressure-sensitive mat 31) of the pressure-sensitive mat 31.

The plurality of LEDs 36 include six LEDs 36 disposed at one end portion in longitudinal direction of the resin sheet 35, and six LEDs 36 disposed at the other end portion in longitudinal direction of the resin sheet 35. The six LEDs 36 at one end portion in longitudinal direction are disposed in parallel in width direction in spaced apart relation from each other. The six LEDs 36 at the other end portion in longitudinal direction are disposed in parallel in width direction in spaced apart relation from each other so as to coincide with the six LEDs 36 at one end portion longitudinal direction when projected in longitudinal direction. In this manner, the LED 36 allows the light to enter the end portion in longitudinal direction of the resin sheet 35. The position of the LED 36, that is, the end portion in longitudinal direction of the resin sheet 35, is an example of the first position. The LEDs 36 are, although not shown, electrically connected to the control unit as an example of the processor.

The second layer 33 is disposed at a lower half of the pressure-sensitive mat 31 while making contact with the lower face of the first layer 32. The second layer 33 includes a cushioning material 37 and a plurality of (six) rod sensors 38.

The cushioning material 37 is, similarly to the resin sheet 35, formed into a rectangular shape when viewed in plan view. The cushioning material 37 is composed of a material softer than the resin sheet 35, for example, foam such as polyurethane sponge. The length in longitudinal direction and the width direction of the cushioning material 37 are the same as the length in longitudinal direction and length in width direction of the resin sheet 35. The thickness of the cushioning material 37 is the length in up-down direction of the rod sensor 38 or more. The upper face of the cushioning material 37 is in contact with the lower face of the resin sheet 35.

The plurality of (six) rod sensors 38 are embedded in the cushioning material 37, and are disposed in parallel in longitudinal direction of the pressure-sensitive mat 31 in spaced apart relation from each other. The rod sensor 38 has a generally cylindrical bar shape extending in width direction of the pressure-sensitive mat 31. The rod sensor 38 includes resin rods 39, two photodiodes 40, and a cover 41.

The resin rods 39 are composed, similarly to the resin member 2 in the first embodiment, of the above-described photoelastic polyurethane resin, and is formed into a bar shape extending in width direction of the pressure-sensitive mat 31.

The two photodiodes 40 are embedded in the resin rod 39, one each at both end portions in width direction. In this manner, the photodiodes 4B are capable of receiving light that passed through the resin rod 39 from the inner side in width direction to the outside in width direction. The position of the photodiodes 4B is, that is, the end portion in width direction of the resin rod 39, is an example of the second position.

The cover 41 is formed, similarly to the cover 5 in the first embodiment, into a generally cylindrical shape extending in longitudinal direction of the rod sensor 38, and covers the resin rod 39. The cover 41 is composed of a resin material that is transparent, and that has a refraction lower than that of the photoelastic polyurethane resin. The upper end portion of the cover 41 is in contact with the lower face of the resin sheet 35. When the cover 41 has a refraction higher than the refraction of the resin sheet 35, the light that passes through the resin sheet 35 may not be transmitted easily to the resin rod 39 when the pressure-sensitive mat 31 is pressed. When the cover 41 has a refraction that is the same level as the refraction of the resin sheet 35, a portion of light that passes through the resin sheet 35 may be transmitted to the resin rod 39 even when the pressure-sensitive mat 31 is not pressed.

The cover layer 34 forms the outer skin portion of the pressure-sensitive mat 31. The cover layer 34 covers the first layer 32 and the second layer 33 altogether. The cover layer 34 is composed of, in view of texture, for example, fabric such as cotton and polyester.

The operation of the pressure-sensitive mat 31 is described next.

When the pressure-sensitive mat 31 is not pressed, the resin sheet 35 of the sheet sensor 30 or the resin rod 39 of the rod sensor 38 are not pressed, and not deformed. Therefore, no birefringence is caused in the resin sheet 35 or the resin rod 39. In this manner, the light from the LED 36 of the sheet sensor 30 is not transmitted to the resin rod 39, and the photodiode 40 does not receive the light.

Then, the control unit as an example of the processor of the pressure-sensitive mat 31 determines that the pressure-sensitive mat 31 is not pressed.

When the pressure-sensitive mat 31 is pressed, the resin sheet 35 and the resin rod 39 are compressed (deformed) at the pressed portion, and birefringence is caused.

Then, the light from the LED 36 of the sheet sensor 30 scatters at the portion A1 where birefringence is caused in the resin sheet 35. The light scattered at the portion A1 is transmitted to the portion A2 where birefringence is caused in the resin rod 39.

The light transmitted to the resin rod 39 is scattered at the portion A2. The light scattered at the portion A2 passes through the resin rod 39, and is received by the two photodiodes 40 at both ends of the resin rod 39.

At this time, the light having higher intensity is detected at the portion near the pressed portion in the photodiode 40, and the light detected by the photodiode 40 gets weaker as the position goes far from the pressed portion.

The control unit determines the position in longitudinal direction of the pressed portion from the position in longitudinal direction of the resin rod 39 having the photodiode 40 that received the light.

The control unit determines the position in width direction of the pressed portion based on the difference in light intensities detected by the two photodiodes 40.

The position in longitudinal direction and position in width direction of the pressed portion can be specified in this manner.

Similarly to the first embodiment, the control unit can measure the pressure applied to the pressure-sensitive mat 31 based on the light intensity detected by the two photodiodes 40.

The pressure-sensitive mat 31 is suitable for use by, for example, setting at the floor in which a nursing bed is placed, and detecting if the care receiver is off the bed and on the floor, and for watching the care receiver. When the pressure-sensitive mat 31 is used for an entrance mats, coming and going of people from the entrance can be detected, which makes it suitable for crime prevention.

Figure 11:
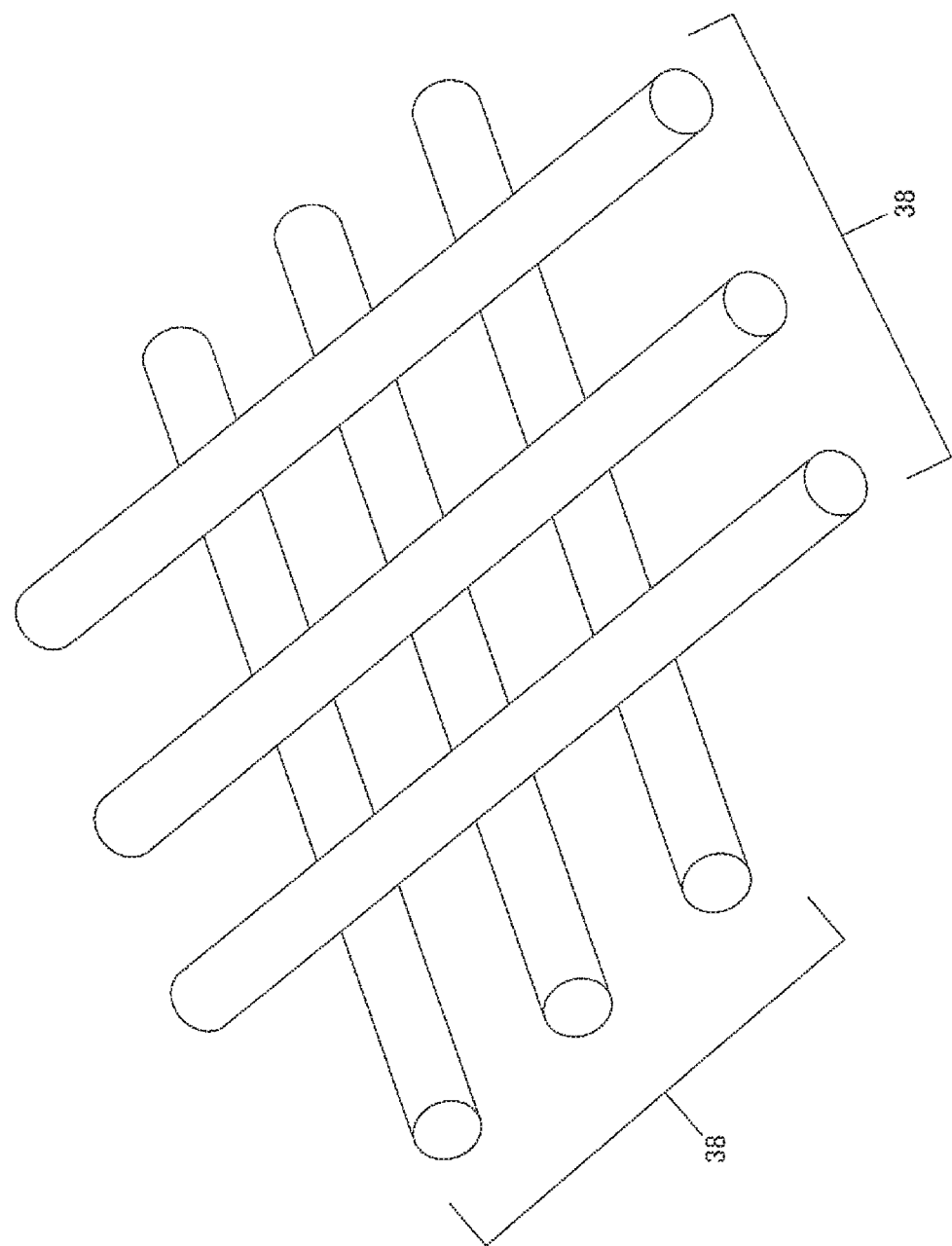
FIG. 11 is a figure illustrating a modified example of the pressure-sensitive mat.

As shown in FIG. 11, in the above-described second embodiment, similarly to the second layer 33, a plurality of rod sensors 38 can be used instead of the sheet sensor 30 of the first layer 32. In this case, the rod sensor 38 of the first layer 32 and the rod sensor 38 of the second layer 33 are placed on top of another like a grid. In this modified example, no cushioning material 37 is provided between the rod sensors 38.

In this modified example, at the intersection of the rod sensor 38 of the first layer 32 and the rod sensor 38 of the second layer 33, light is transmitted from the rod sensor 38 of the first layer 32 to the rod sensor 38 of the second layer 33, and similarly to the above-described pressure-sensitive mat 31, the position in longitudinal direction and the position in width direction of the pressed portion are specified, and the pressure applied to the pressure-sensitive mat 31 can be calculated.

In this modified example, air goes through between the rod sensors 38, and therefore even when it is placed on or inside the mattress of the nursing bed, musty bed can be suppressed.

Third Embodiment

In the following, a sensor 50 as a third embodiment of the detection member of the present invention is described. In the third embodiment, the members that are the same as the above-described first embodiment are given the same reference numerals, and descriptions thereof are omitted.

In the third embodiment, the sensor 50 is configured as a bending sensor that detects bending of the resin member 2.

Figure 12:
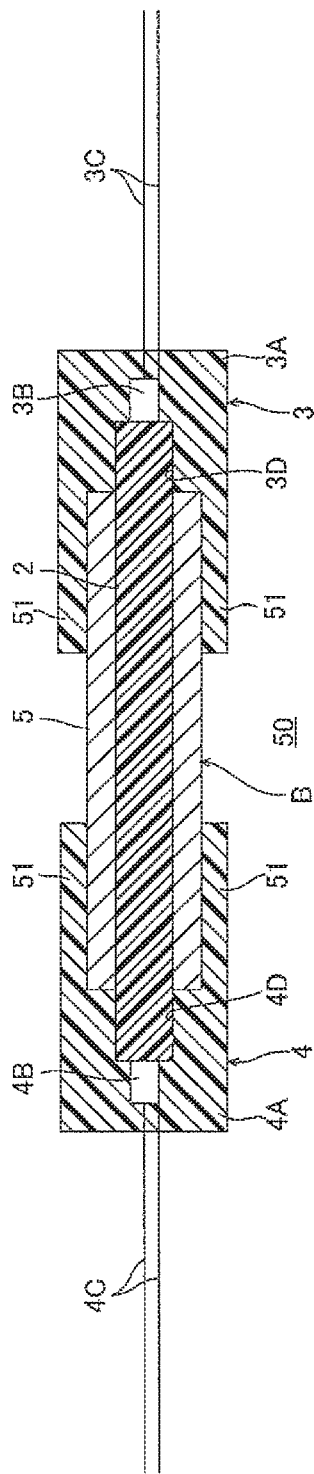
FIG. 12 is a perspective view illustrating a sensor as a third embodiment of the detection member of the present invention.

The sensor 50 is configured as the same as the sensor 1 of the first embodiment, except that, as shown in FIG. 12, the cap member 3A of the light generating unit 3 and the cap member 4A of the light receiving unit 4 includes a regulation unit 51 that regulates bending of the resin member 2.

The regulation unit 51 of the light generating unit 3 is formed into a generally cylindrical shape extending from the other end portion of the cap member 3A to the other side. The regulation unit 51 of the light generating unit 3 covers the one end portion of the cover 5. The regulation unit 51 of the light generating unit 3 is formed from, for example, hard resin, and regulates bending of one end portion of the cover 5 and one end portion of the resin member 2.

The regulation unit 51 of the light receiving unit 4 is formed into a generally cylindrical shape extending from one end portion of the cap member 4A to one side. The regulation unit 51 of the light receiving unit 4 covers the other end portion of the cover 5. The regulation unit 51 of the light receiving unit 4 is formed from, for example, hard resin, and regulates bending of the other end portion of the resin member 2 and the other end portion of the cover 5. The regulation unit 51 of the light receiving unit 4 is disposed to face the regulation unit 51 of the light generating unit 3 in spaced apart relation.

In this manner, only the center portion in longitudinal direction of the resin member 2 (in the following, may be referred to as bending portion B.) is exposed from the cap member 3A of the light generating unit 3 and the cap member 4A of the light receiving unit 4, and is bendable.

Figure 13:
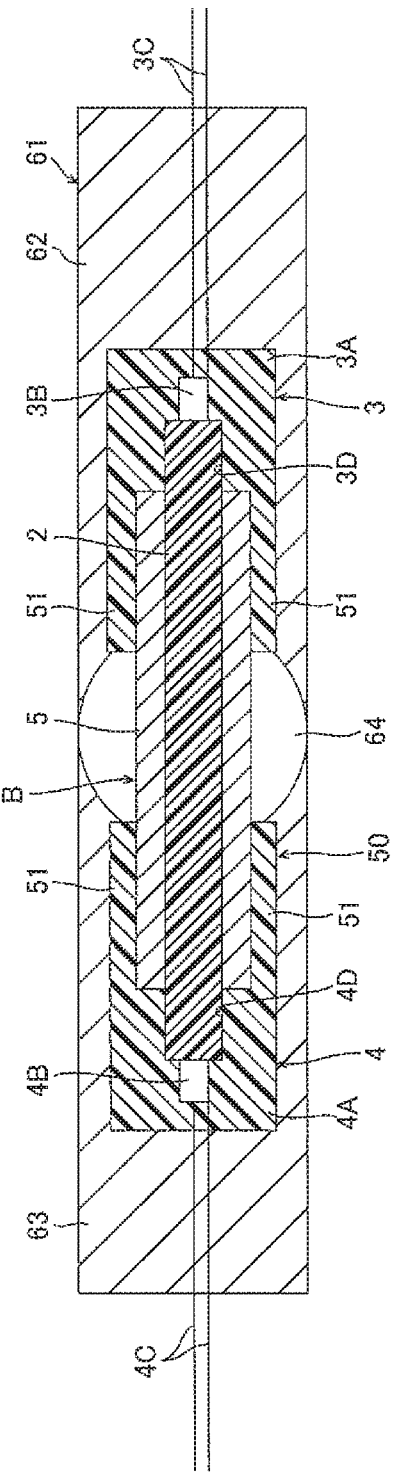
FIG. 13 is a figure illustrating a state in which the sensor shown in FIG. 12 is placed on an arm.

Next, with reference to FIG. 13, an arm 61 including the sensor 50 is described.

The arm 61 includes a first arm portion 62, a second arm portion 63, a joint portion 64, and a sensor 50.

The first arm portion 62 configures one half of the arm 61, and is formed into a generally pillar shape extending in one side and the other side.

The second arm portion 63 configures the other half of the arm 61, and is formed into a generally pillar shape extending in one side and the other side.

The joint portion 64 is disposed between the first arm portion 62 and the second arm portion 63. The joint portion 64 connects the first arm portion 62 and the second arm portion 63 so that they are rotatable.

The sensor 50 is fixed to the first arm portion 62 in the light generating unit 3, and is fixed to the second arm portion 63 in the light receiving unit 4 so that the bending portion B is disposed at the joint portion 64.

Operation of the sensor 50 is described next.

When the arm 61 is bent at the joint portion 64, the sensor 50 is bent at the bending portion B following the bending of the arm 61.

Then, significant birefringence is caused as the degree of the bending of the bending portion B increases. In this manner, as the degree of bending of the bending portion B increases, similarly to the above-described first embodiment, the quantity of light received by the photodiode 4B attenuates.

Base on the attenuation of the quantity of light received by the photodiode 4B, the degree of bending angle at the arm 61 can be measured accurately.

Other Modified Examples

For the light generating member, in addition to the above-described LED, for example, a semiconductor laser (wavelength 405 nm to 1064 nm), a fluorescent lamp, a halogen lamp, and a tungsten lamp may be used.

When LEDs are used as the light generating member, for example, red LED, white LED, infrared LED, green LED, and blue LED may be used.

For the light receiving member, in addition to general photodiode, photo IC diode can also be used. In the photo IC diode, inside general photodiode, an amplification circuit for photo current is embedded, and the photo current generated at the photodiode is amplified to 1000 times to several 1000 times, and outputted to the outside. It is preferable that when a general photodiode is used, a known amplification circuit is connected to the photodiode, and the photo current is amplified to about 1000 times to 10000 times.

For the light receiving member, a detector other than the photodiode, for example, a photoconductive detector such as CdS cell, and a thermosensitive light detector such as bolometer can be used.

A linear polarizing plate can be placed between the photoelastic polyurethane resin and the light generating unit, and between the photoelastic polyurethane resin and the light receiving unit. In such a case, the two linear polarizing plates are preferably set so that their plane of polarization coincide with each other. Alternatively, instead of the two linear polarizing plates, two circular polarizing plates can be set. When the circular polarizing plate is used, two circular polarizing plates that are having the same rotational direction of the electric field vector are preferably used. For example, when a right rotation circular polarizing plate is set for the light generating unit side, a right rotation circular polarizing plate is preferably set for the light receiving side.

EXAMPLES

The present invention is described in further detail in the following with reference to Examples and Comparative Examples, but the present invention is not limited to these Examples. The "parts" and "%" are based on mass unless otherwise specified. The specific numeral values such as the mixing ratio (content), physical property value, and parameter used in description below can be replaced with the corresponding mixing ratio (content), the physical property value, and parameter, that is, the upper limit value (numeral values defined with "or less", "less than") or the lower limit value (numeral values defined with "or more", "more than") of the corresponding description used in the above-described "DESCRIPTION OF EMBODIMENTS".

<Description of Materials>

A. High-Molecular Weight Polyol
  (1) PTG-650SN (polytetramethylene ether glycol, hydroxyl number 162.9 mgKOH/g, manufactured by Hodogaya Chemical Co., Ltd.)
  (2) PTG-1000 (polytetramethylene ether glycol, hydroxyl number 111.5 mgKOH/g, manufactured by Hodogaya Chemical Co., Ltd.)
  (3) PTG-2000SN (polytetramethylene ether glycol, hydroxyl number 57.0 mgKOH/g, manufactured by Hodogaya Chemical Co., Ltd.)

B. Low-Molecular-Weight Polyol
  (1) 1,2,6-hexanetriol
  (2) Trimethylolpropane
  (3) 3-methyl-1,5-pentanediol C. Isocyanate
  (1) 3,3'-dimethylbiphenyl-4,4'-diisocyanate (TODI, manufactured by NIPPON SODA CO., LTD.)
  (2) 4,4'-diphenylmethane diisocyanate (MDI-PH, manufactured by Mitsui Chemicals, Inc.)

D. Additive
  (1) Antioxidant
  (2) Plasticizer (diisononyl phthalate, DINP)
  (3) Plasticizer (4-cyano-4'-pentylbiphenyl, liquid crystal 5CB)

<Production of Photoelastic Polyurethane Resin>

Example 1

A glass-made flask was charged with PTG-650SN, PTG-1000, and an antioxidant in a blending amount shown in Table 1, and the mixture was dried under reduced pressure at 120° C. for 2 hours. The temperature was decreased to 80° C., and the pressure was set back to normal pressure with nitrogen.

Then, while stirring, 3,3'-dimethylbiphenyl-4,4'-diisocyanate was added in a blending amount shown in Table 1 so that the isocyanate index was 35, and reaction was conducted for 4 hours.

Then, while stirring, trimethylolpropane was added in a blending amount shown in Table 1, and the temperature was adjusted to 70° C.

Then, a few drops of an antifoaming agent were added, and 4,4'-diphenylmethane diisocyanate melted at 70° C. was added in a blending amount shown in Table 1 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

Then, the produced polyurethane composition was poured into a mold (30 cm×10 cm×2 mm), and curing was conducted at 50° C. for 48 hours, thereby producing photoelastic polyurethane resin having a sheet shape and having a thickness of 2 mm.

Separately, a silicone tube (external diameter 10 mm, internal diameter 7 mm, length 60 cm) was charged with the produced polyurethane composition, one end was pinched with a pinchcock, hung in an oven at 50° C. for 48 hours. Curing was conducted, thereby producing photoelastic polyurethane resin having a bar shape and a diameter of 7 mm.

Example 2

A glass-made flask was charged with PTG-650SN, PTG-1000, and an antioxidant in a blending amount shown in Table 1, and the mixture was dried under reduced pressure at 120° C. for 2 hours. The temperature was decreased to 80° C., and the pressure was set back to normal pressure with nitrogen.

Then, while stirring, 1,2,6-hexanetriol was added in a blending amount shown in Table 1, and the temperature was adjusted to 70° C.

Then, a few drops of an antifoaming agent were added, and 4,4'-diphenylmethane diisocyanate melted at 70° C. was added in a blending amount shown in Table 1 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

The produced polyurethane composition was cured in the same manner as in Example 1, thereby producing photoelastic polyurethane resin having a sheet shape and a thickness of 2 mm and photoelastic polyurethane resin having a bar shape and a diameter of 7 mm.

Example 3

A glass-made flask was charged with PTG-1000 and an antioxidant in a blending amount shown in Table 1, and the mixture was dried under reduced pressure at 120° C. for 2 hours. The temperature was decreased to 80° C., and the pressure was set back to normal pressure with nitrogen.

Then, while stirring, 1,2,6-hexanetriol was added in a blending amount shown in Table 1, and the temperature was adjusted to 70° C.

Then, a few drops of an antifoaming agent were added, and 4,4'-diphenylmethane diisocyanate melted at 70° C. was added in a blending amount shown in Table 1 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

The produced polyurethane composition was cured in the same manner as in Example 1, thereby producing photoelastic polyurethane resin having a sheet shape and a thickness of 2 mm, and photoelastic polyurethane resin having a bar shape and a diameter of 7 mm.

Example 4

A glass-made flask was charged with PTG-1000 and an antioxidant in a blending amount shown in Table 2, and the mixture was dried under reduced pressure at 120° C. for 2 hours. The temperature was decreased to 80° C., and the pressure was set back to normal pressure with nitrogen.

Then, while stirring, 3,3'-dimethylbiphenyl-4,4'-diisocyanate was added in a blending amount shown in Table 2 so that the isocyanate index was 35.3, and reaction was conducted for 4 hours.

Then, while stirring, trimethylolpropane was added in a blending amount shown in Table 2, and the temperature was adjusted to 70° C.

Then, a few drops of an antifoaming agent were added, and 4,4'-diphenylmethane diisocyanate melted at 70° C. was added in a blending amount shown in Table 2 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

The produced polyurethane composition was cured in the same manner as in Example 1, thereby producing photoelastic polyurethane resin having a sheet shape and a thickness of 2 mm, and photoelastic polyurethane resin having a bar shape and a diameter of 7 mm.

Example 5

Photoelastic polyurethane resin having a sheet shape and having a thickness of 2 mm and photoelastic polyurethane resin having a bar shape and a diameter of 7 mm were produced in the same manner as in Example 4, except that the materials were blended in a blending amount shown in Table 2.

Example 6

A glass-made flask was charged with PTG-1000 and an antioxidant in a blending amount shown in Table 2, and the mixture was dried under reduced pressure at 120° C. for 2 hours. The temperature was decreased to 80° C., and the pressure was set back to normal pressure with nitrogen.

Then, while stirring, trimethylolpropane was added in a blending amount shown in Table 2, and the temperature was adjusted to 70° C.

Then, a few drops of an antifoaming agent were added, and 4,4'-diphenylmethane diisocyanate melted at 70° C. was added in a blending amount shown in Table 2 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

The produced polyurethane composition was cured in the same manner as in Example 1, thereby producing photoelastic polyurethane resin having a sheet shape and having a thickness of 2 mm, and photoelastic polyurethane resin having a bar shape and a diameter of 7 mm.

Examples 7 to 9

Photoelastic polyurethane resin having a sheet shape and having a thickness of 2 mm and photoelastic polyurethane resin having a bar shape and a diameter of 7 mm were produced in the same manner as in Example 5, except that the materials were blended in a blending amount shown in Table 2. The plasticizer was blended in the produced polyurethane composition.

Examples 10 to 15

Photoelastic polyurethane resin having a sheet shape and having a thickness of 2 mm and photoelastic polyurethane resin having a bar shape and a diameter of 7 mm were produced in the same manner as in Example 5, except that the materials were blended in a blending amount shown in Table 3. The plasticizer was blended in the produced polyurethane composition.

Comparative Example 1

A glass-made flask was charged with PTG-650SN and an antioxidant in a blending amount shown in Table 1, the mixture was dried under reduced pressure at 120° C. for 2 hours, and the pressure was set back to normal pressure with nitrogen.

Then, while stirring, 1,2,6-hexanetriol was added in a blending amount shown in Table 1, and the temperature was adjusted to 70° C.

Then, a few drops of an antifoaming agent were added, and 4,4'-diphenylmethane diisocyanate melted at 70° C. was added in a blending amount shown in Table 1 so that the isocyanate index was 105, and the mixture was stirred.

Thereafter, defoaming was conducted under reduced pressure for 30 seconds, and the pressure was set back to normal pressure with nitrogen. Thereafter, it was taken out from the flask, thereby producing a polyurethane composition.

The produced polyurethane composition was cured in the same manner as in Example 1, thereby producing photoelastic polyurethane resin having a sheet shape and having a thickness of 2 mm and photoelastic polyurethane resin having a bar shape and a diameter of 7 mm.

<Physical Properties Evaluation on Photoelastic Polyurethane Resin>
(1) Photoelastic Constant and Young's Modulus Measurement was conducted in accordance with description of "photoelastic constant measurement method" in "development of a system for measuring the photoelastic constants of optical films" in Journal of The Japan Society for Precision Engineering vol. 73, 253-258 (2007) by Mitsuo Tuskiji, Hiroyuki Takada, and Yoshiro Tajitsu" to obtain distortion optical constant and Young's modulus at 25° C., and photoelastic constant at 25° C. was calculated therefrom. For the above-described measurement, laser light having a wavelength of 630 nm was used. Table 1. Table 2, and Table 3 show the photoelastic constant and the Young's modulus in Examples and Comparative Examples.

(2) Dynamic Viscoelasticity

A sample piece was cut into a strip of a length of 2.5 cm, a width of 5.0 mm, and a thickness of 2.0 mm. The sample was measured using a dynamic viscoelasticity measuring apparatus (VES-F-III, VISCO-ELASTICSPECTROMETER, manufactured by Iwamoto Seisakusho Co., Ltd.), with a temperature distribution mode at a temperature increase rate of 5° C./min, a frequency of 10 Hz, an amplitude of ±0.01 mm, to obtain a storage modulus (E'), loss modulus (E"), and loss tangent (tan δ). The temperature of the peak value of the loss tangent (tan δ) of the obtained data was defined as the glass transition temperature. Table 1, Table 2, and Table 3 show the storage modulus (E'), loss modulus (E"), loss tangent (tan δ) and glass transition temperature of Examples and Comparative Examples.

(3) Frequency Dependence of Photoelastic Constant at 40° C., 20° C., and −10° C.

Figure 14:
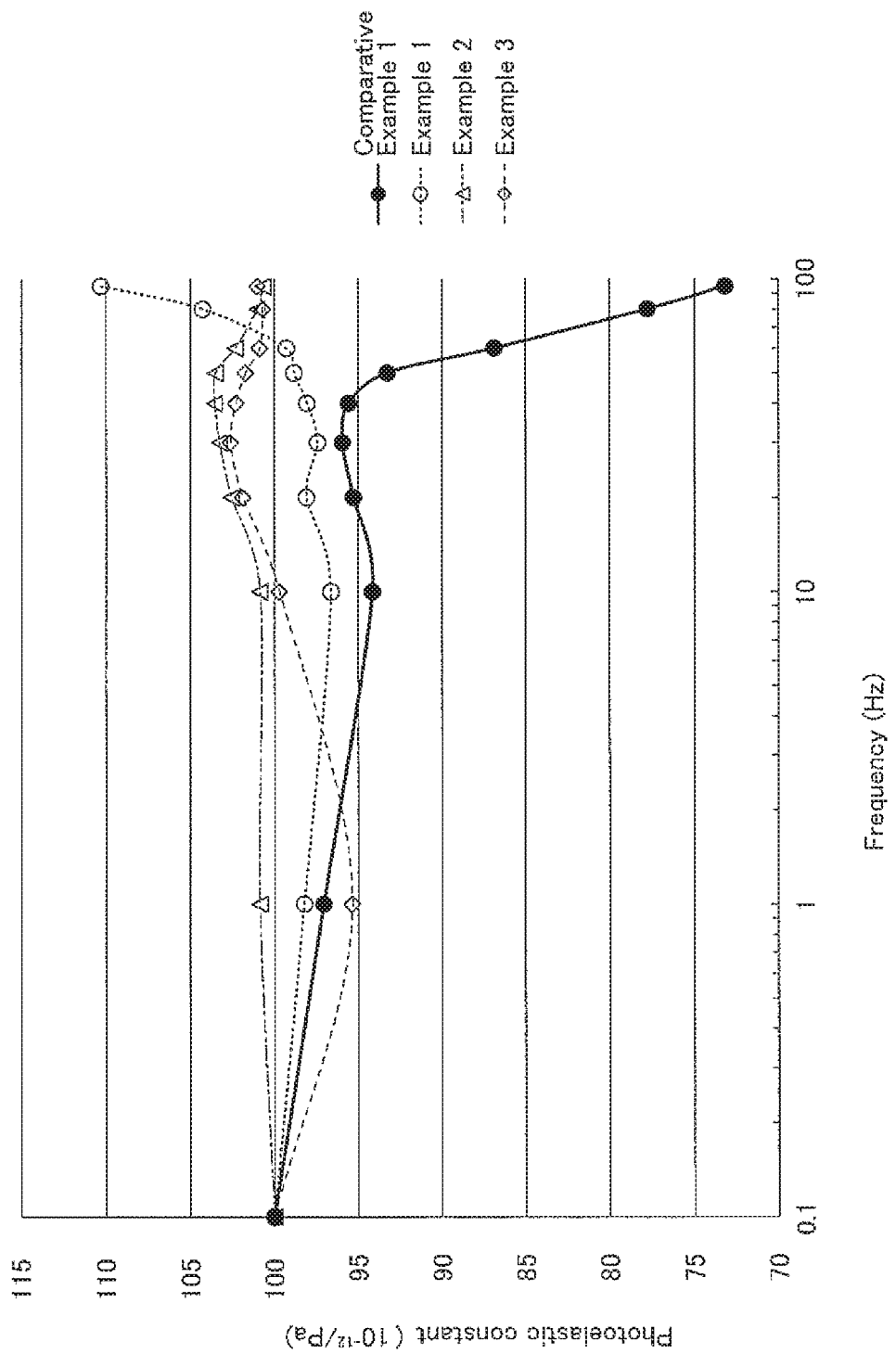
FIG. 14 is a graph illustrating relationship between the photoelastic constant at −10° C., and the frequency.

The frequency dependence of photoelastic constant in Examples 1 to 3 and Comparative Example 1 was measured with the measurement frequency changed between 0.1 to 100 Hz. Table 1 shows the ratio of the photoelastic constant at a frequency of 100 Hz setting the value at 0.1 Hz to 100. FIG. 14 shows the frequency dependence of photoelastic constant at −10° C. of Examples 1 to 3 and Comparative Example 1.

In Comparative Example 1, when the frequency is 50 Hz or more, the photoelastic constant decreases drastically.

In contrast, in Examples 1 to 3, in the range of frequency of 0.1 Hz to 100 Hz, no significant drop in photoelastic constant was confirmed. Particularly, in Examples 2 and 3, the photoelastic constant was keeping the constant value most of the time without depending on the frequency.

TABLE 1

|  |  |  | Ex. 1 | Ex. 2 | Ex. 3 | Comp. Ex. 1 |
|---|---|---|---|---|---|---|
| Blending formulation (parts by mass) | High molecular weight polyol | PTG-1000 | 50 | 43 | 100 | — |
|  |  | PTG-650SN | 50 | 57 | — | 100 |
|  | Low molecular-weight polyol | 1,2,6-hexanetriol | — | 0.29 | 0.41 | 0.41 |
|  |  | Trimethylolpropane | 0.50 | — | — | — |
|  | Polyisocyanate | 3,3'-dimethylbiphenyl-4,4'-diisocyanate | 11.3 | — | — | — |
|  |  | 4,4'-diphanylmethane diisocyanate | 22.9 | 34.1 | 27.3 | 39.9 |
|  |  | Antioxidant | 0.2 | 0.2 | 0.2 | 0.2 |
|  | Aromatic ring concentration (mass %) |  | 15.5 | 15.8 | 13.3 | 17.7 |
| Dynamic viscoelasticity | Storage modulus (MPa) |  | 5.51 | 5.69 | 5.81 | 5.87 |
|  | Loss modulus (MPa) |  | 0.114 | 0.121 | 0.132 | 0.152 |
|  | Tanδ |  | 0.021 | 0.021 | 0.023 | 0.026 |
|  | Glass transition temperature (° C.) |  | −24 | −27 | −36 | −17 |
| Photoelasticity(25° C.) | Photoelastic constant ($10^{-12}$ $Pa^{-1}$) |  | 5850 | 3960 | 3550 | 4680 |
|  | Young's modulus (MPa) |  | 4.48 | 4.95 | 4.84 | 4.47 |

TABLE 1-continued

|  |  |  | Ex. 1 | Ex. 2 | Ex. 3 | Comp. Ex. 1 |
|---|---|---|---|---|---|---|
| Photoelastic constant (100 Hz) | Measurement temperature (° C.) | 40 | 101 | 100 | 99 | 100 |
|  |  | 20 | 102 | 98 | 100 | 98 |
|  |  | −10 | 110 | 101 | 101 | 73 |

TABLE 2

|  |  |  | Example 4 | Example 5 | Example 6 | Example 7 | Example 8 | Example 9 |
|---|---|---|---|---|---|---|---|---|
| Blending formulation (parts by mass) | High molecular weight polyol | PTG-1000 | 100 | 100 | 100 | 100 | 100 | 100 |
|  | Low molecular-weight polyol | Trimethylolpropane | 1.0 | 0.5 | 0.5 | 0.5 | 0.5 | 0.5 |
|  | Polyisocyanate | 3,3'-dimethylbiphenyl-4,4'-diisocyanate | 9.2 | 9.2 | — | 9.2 | 9.2 | 9.2 |
|  |  | 4,4'-diphenylmethane diisocyanate | 20.3 | 18.8 | 27.6 | 18.8 | 18.8 | 18.8 |
|  |  | Antioxidant | 0.2 | 0.2 | 0.2 | 0.2 | 0.2 | 0.2 |
|  | Plasticizer | DINP | — | — | — | 5.0 | 10 | 15 |
|  |  | Aromatic ring concentration (mass %) | 13.8 | 13.3 | 13.4 | 12.8 | 12.4 | 11.9 |
| Dynamic viscoelasticity |  | Storage modulus (MPa) | 5.83 | 5.22 | 5.79 | 5.29 | 4.94 | 4.42 |
|  |  | Loss modulus (MPa) | 0.101 | 0.120 | 0.113 | 0.138 | 0.131 | 0.118 |
|  |  | Tanδ | 0.017 | 0.023 | 0.020 | 0.026 | 0.027 | 0.027 |
|  |  | Glass transition temperature (° C.) | −31 | −33 | −34 | −34 | −36 | −37 |
| Photoelasticity (25° C.) |  | Photoelastic constant ($10^{-12}$ $Pa^{-1}$) | 4780 | 5330 | 3690 | 5000 | 4470 | 4900 |
|  |  | Young's modulus (MPa) | 4.90 | 4.22 | 4.57 | 3.57 | 3.97 | 3.49 |

TABLE 3

|  |  |  | Example 10 | Example 11 | Example 12 | Example 13 | Example 14 | Example 15 |
|---|---|---|---|---|---|---|---|---|
| Blending formulation (parts by mass) | High molecular weight polyol | PTG-2000SN | — | — | — | — | 50 | 50 |
|  |  | PTG-1000 | 50 | 50 | 50 | 100 | 50 | 50 |
|  |  | PTG-650SN | 50 | 50 | 50 | — | — | — |
|  | Low molecular-weight polyol | 3-methyl-1,5-pentanediol | 2 | — | — | — | — | — |
|  |  | Trimethylolpropane | 0.5 | 0.5 | 0.5 | 0.5 | 0.5 | 0.5 |
|  | Polyisocyanate | 3,3'-dimethylbiphenyl-4,4'-diisocyanate | 11.3 | 11.3 | 11.3 | — | — | — |
|  |  | 4,4'-diphenylmethane diisocyanate | 27.3 | 22.9 | 22.9 | 27.4 | 21.1 | 21.1 |
|  |  | Antioxidant | 0.2 | 0.2 | 0.2 | 0.2 | 0.2 | 0.2 |
|  | Plasticizer | DINP | — | — | — | 10 | — | 10 |
|  |  | 5CB | 15 | 10 | 15 | — | — | — |
|  |  | Aromatic ring concentration (mass %) | 15.2 | 14.5 | 14.0 | 12.4 | 10.8 | 10.0 |
| Dynamic viscoelasticity |  | Storage modulus (MPa) | 4.73 | 4.85 | 4.53 | 5.02 | 5.62 | 4.88 |
|  |  | Loss modulus (MPa) | 0.111 | 0.089 | 0.085 | 1.221 | 1.157 | 1.472 |
|  |  | Tanδ | 0.024 | 0.018 | 0.019 | 0.243 | 0.206 | 0.302 |
|  |  | Glass transition temperature (° C.) | −24 | −29 | −30 | −38 | −44 | −47 |
| Photoelasticity (25° C.) |  | Photoelastic constant ($10^{-12}$ $Pa^{-1}$) | 7550 | 7230 | 7580 | 3500 | 3060 | 2980 |
|  |  | Young's modulus (MPa) | 3.79 | 3.93 | 3.61 | 4.02 | 4.53 | 3.66 |

<Pressure Sensor>

The pressure-sensitive sensor was made using the bar shape photoelastic polyurethane resin of Examples 1, 4 to 6, 8, and 10 to 15, as shown in FIG. 1.

The resin member 2 composed of the bar shape photoelastic polyurethane resin is a bar having a diameter of 7 mm and a length of 7 cm, and the silicone tube is removed.

The LED 3B is a red LED. The photodiode 4B is photo IC diode.

The LED 3B is, as shown in the imaginary line in FIG. 2, connected to a series circuit 70 having a battery 71 (direct current 3V) and a variable resistor 72. A voltmeter 73 is connected to the series circuit 70. Then, the variable resistor 72 was adjusted so that the voltage of the voltmeter 73 was 2V with the LED 3B turned on.

Figure 15:
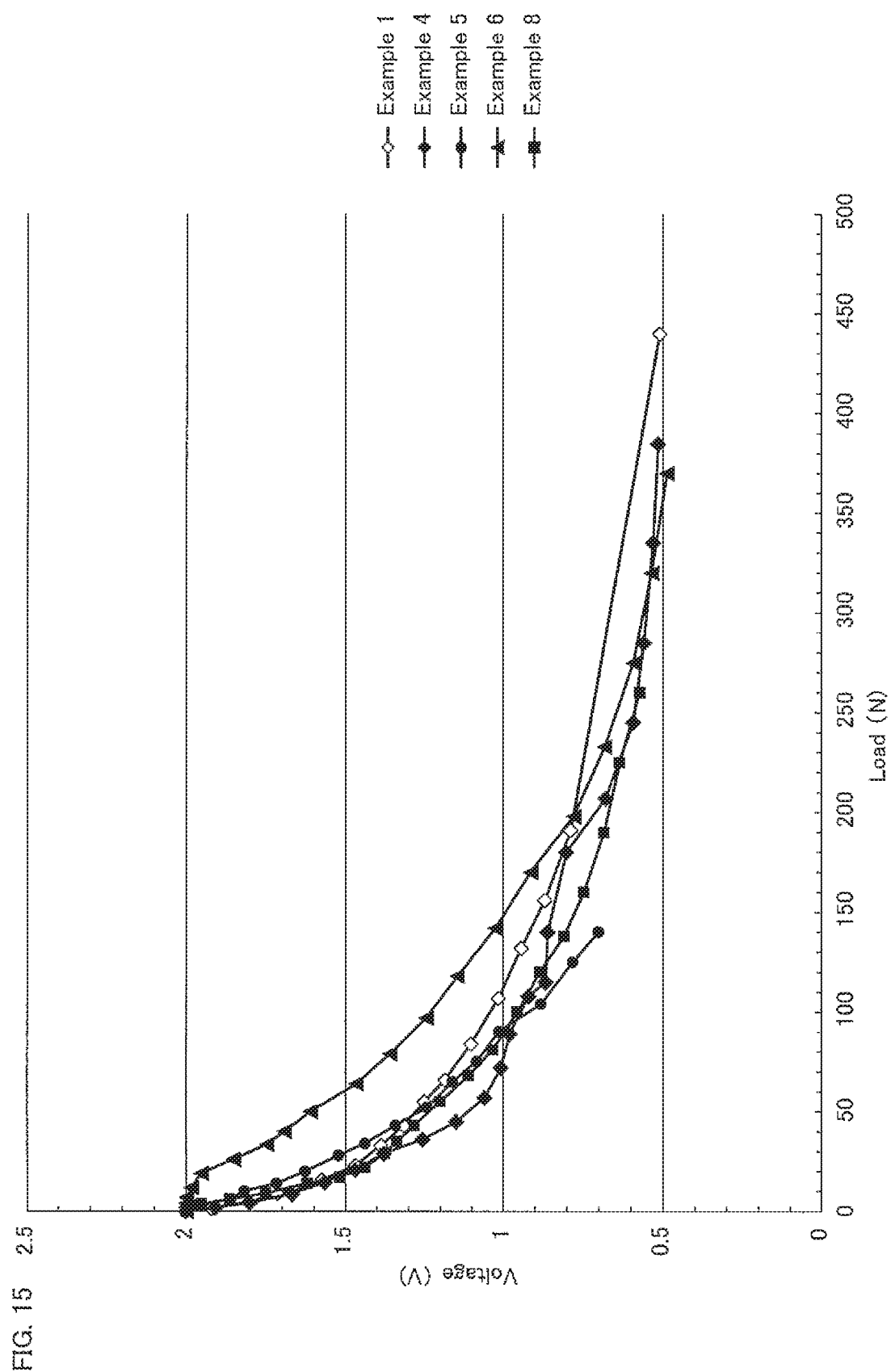
FIG. 15 is a graph illustrating relationship between the load and the voltage when the photoelastic polyurethane resin of Examples 1, 4 to 6, and 8 is used for the pressure-sensitive sensor.
Figure 16:
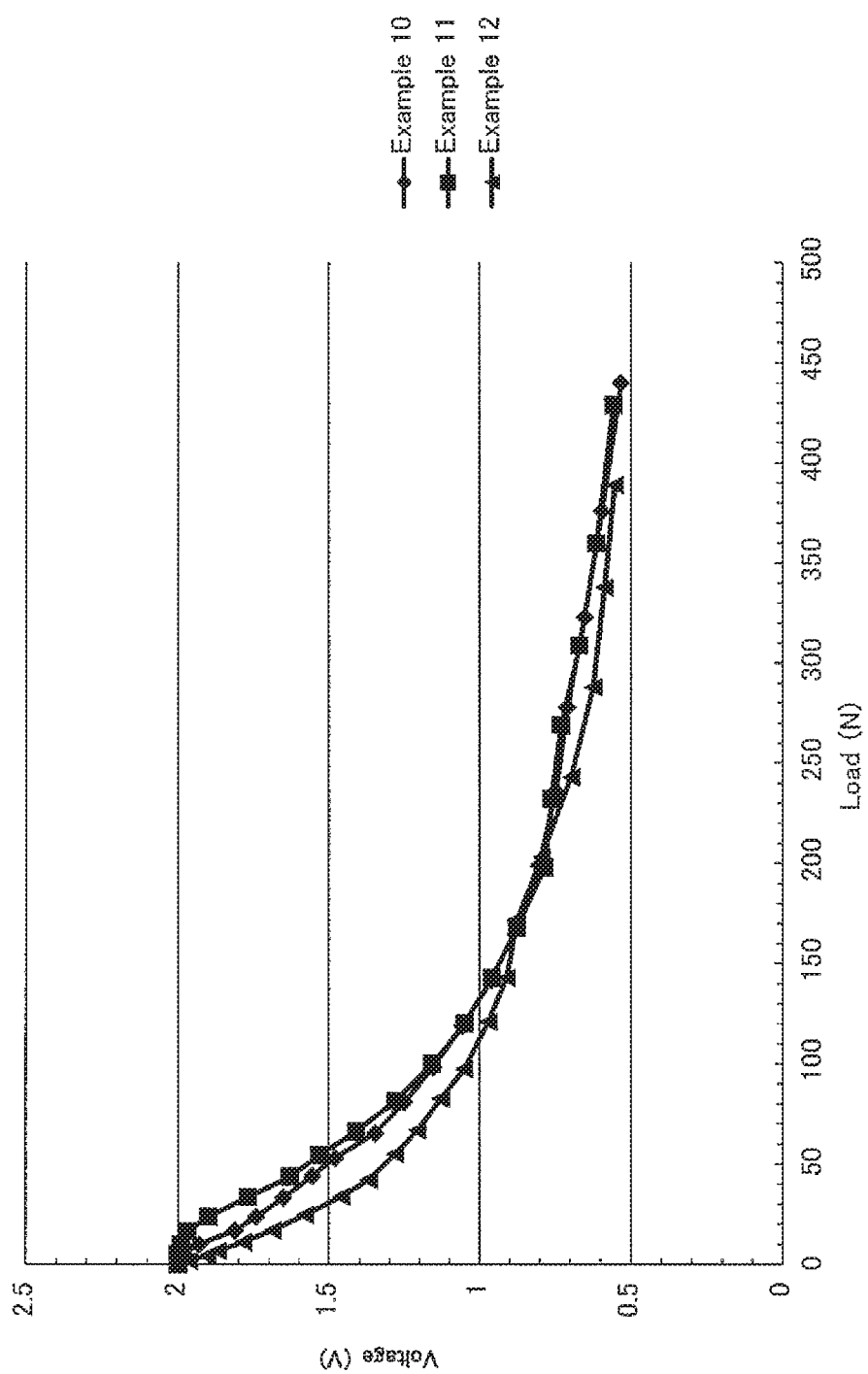
FIG. 16 is a graph illustrating relationship between the load and the voltage when the photoelastic polyurethane resin of Examples 10 to 12 is used for the pressure-sensitive sensor.
Figure 17:
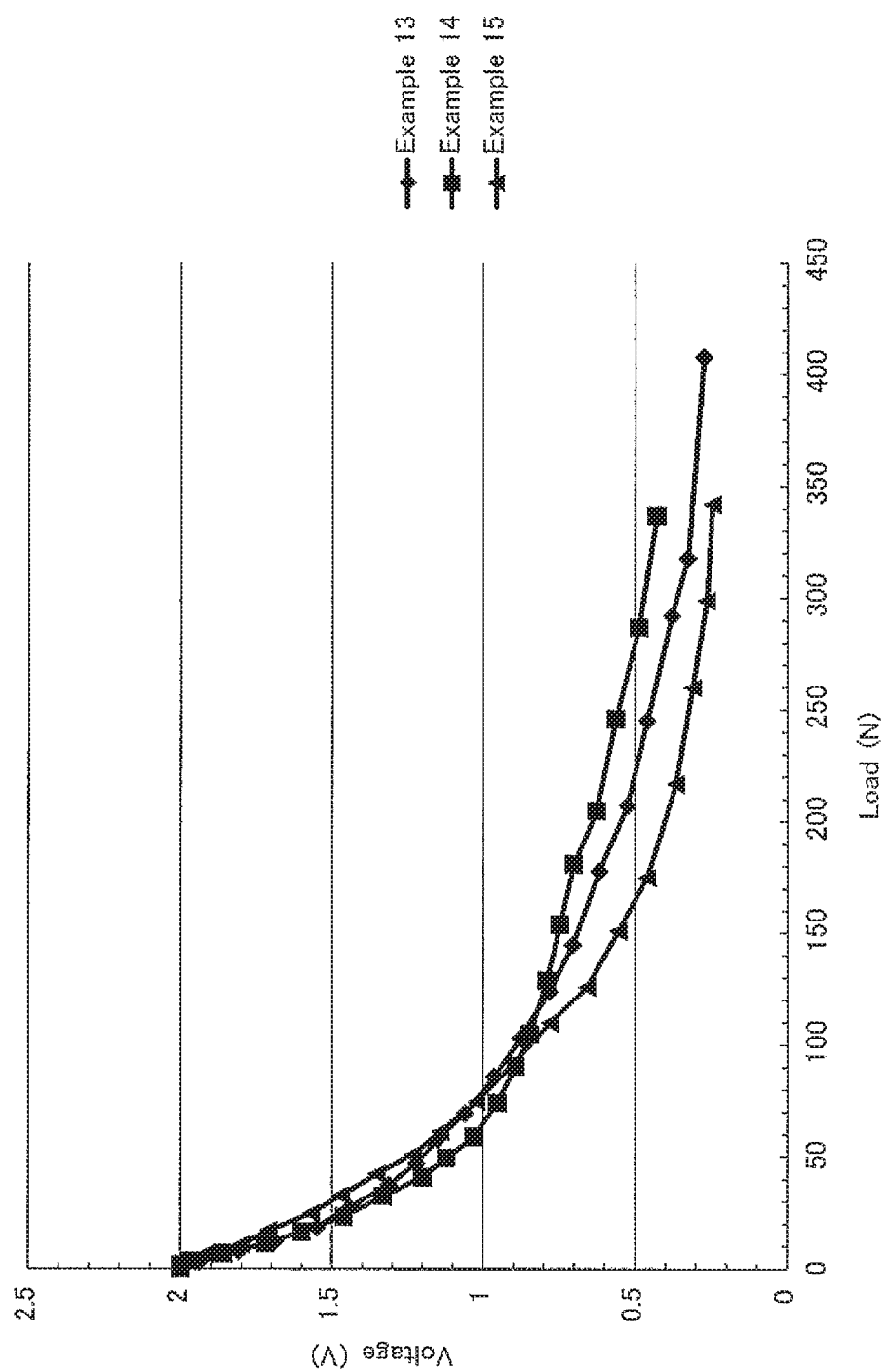
FIG. 17 is a graph illustrating relationship between the load and the voltage when the photoelastic polyurethane resin of Examples 13 to 15 is used for the pressure-sensitive sensor.

The pressure sensor was disposed, as shown in FIG. 2, between the support member S and the pressing member P. Then, a load is applied to the pressing member P, and the load and the voltage measured by the voltmeter 73 were recorded with every drop of the pressing member P by 0.2 mm, until the pressing member P was dropped to 4 mm. The measurement results are shown in FIG. 15 to FIG. 17.

Figure 18:
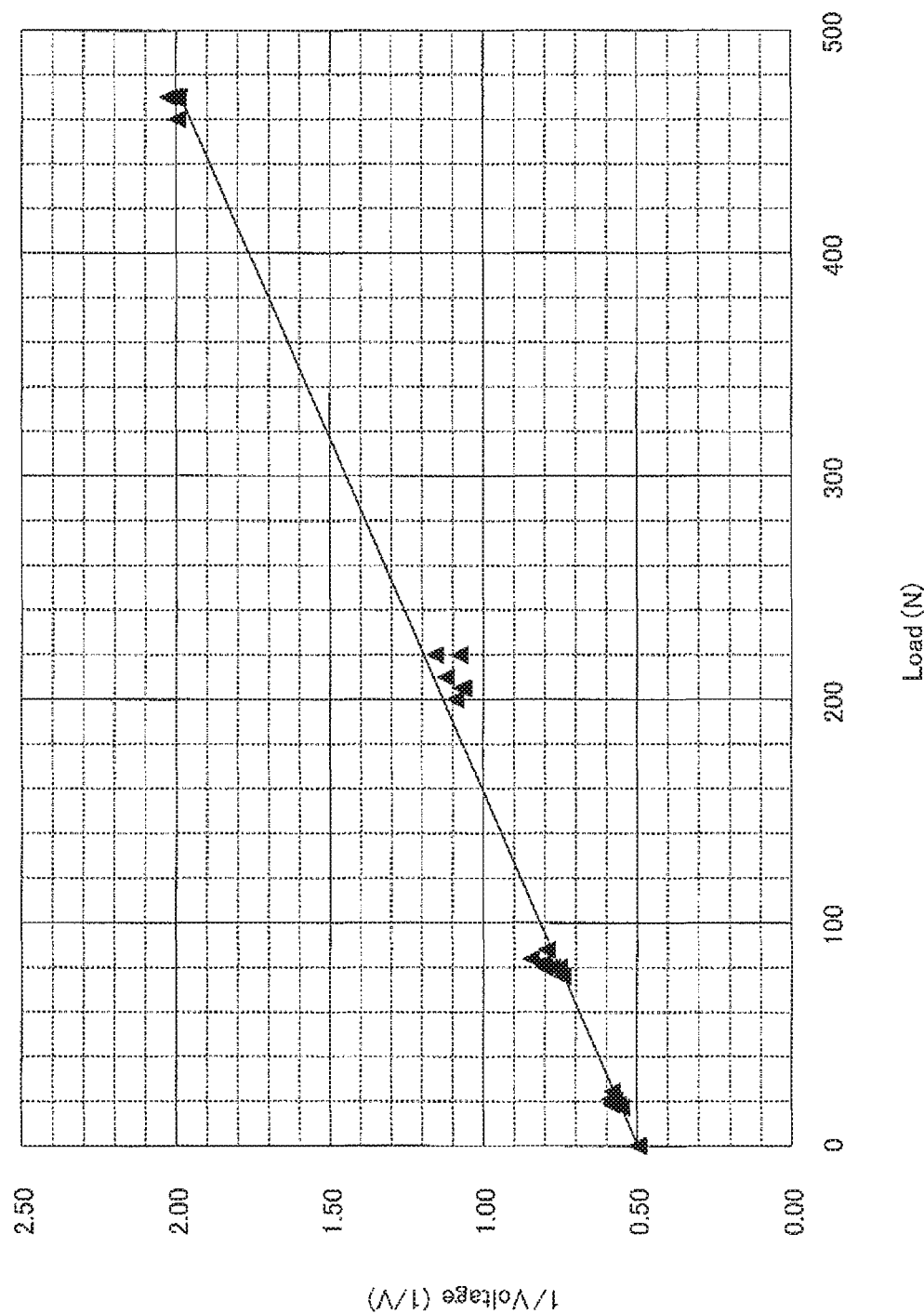
FIG. 18 is a graph illustrating relationship between the load and the inverse number of the voltage when the photoelastic polyurethane resin is used for the pressure-sensitive sensor.
Figure 19:
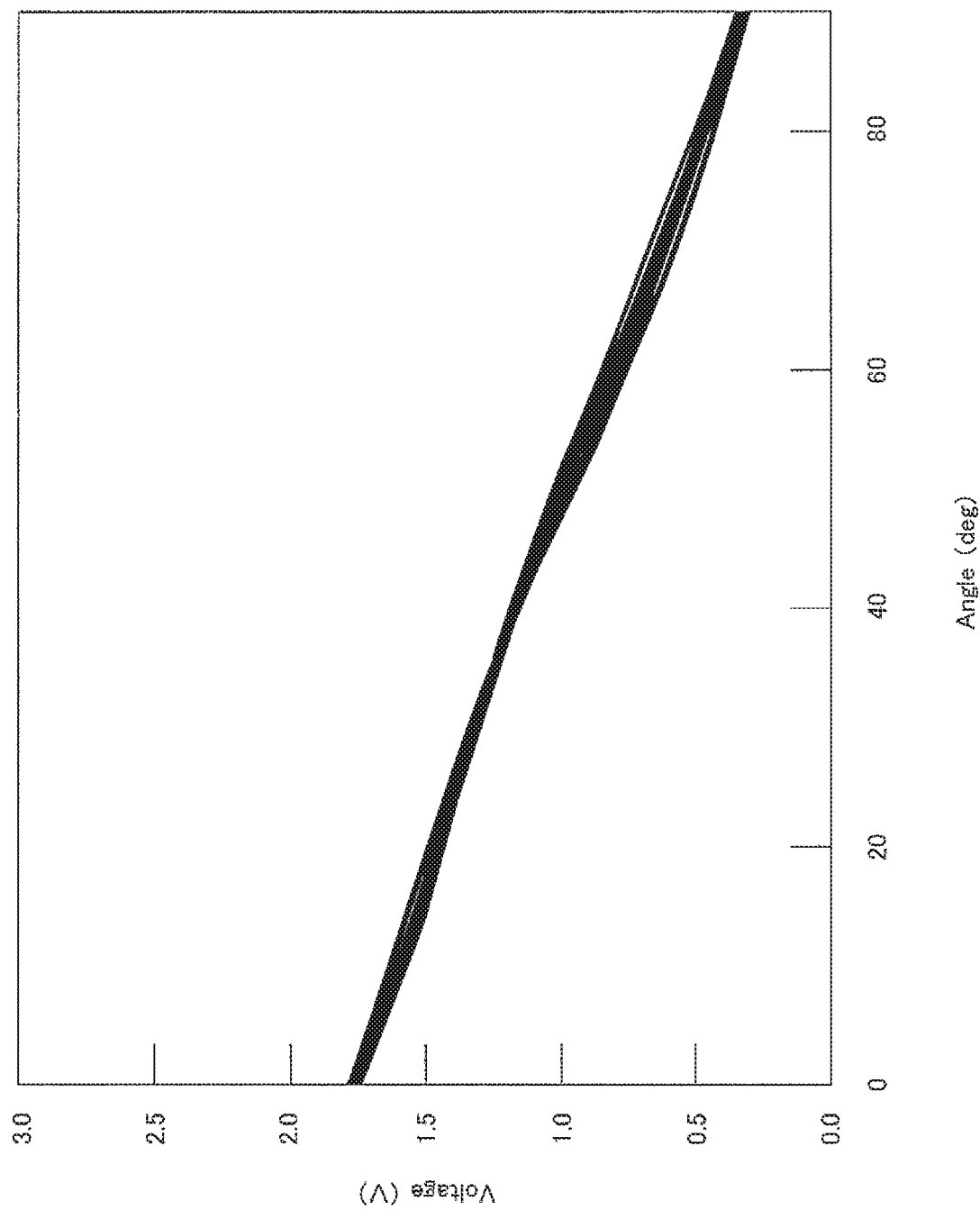
FIG. 19 is a graph illustrating relationship between the angle and the voltage when the photoelastic polyurethane resin is used for an angle sensor.

Similarly, five samples were made from the photoelastic polyurethane resin produced in Example 1, and the load and the voltage were measured. FIG. 18 shows the measurement results setting the vertical axis as the inverse number of the voltage.

Table 4 shows the voltage ($V_{300}$) and sensitivity with the load of 300N of the pressure-sensitive sensor in which the photoelastic polyurethane resin of Examples 1, 4, 6, and 10 to 15 was used.

The sensitivity is a value deducting the voltage with the load of 300N from the voltage with no load (that is, 2V), and with higher sensitivity, a small load can be measured with more accuracy.

Table 4 shows the load and the voltage with the displacement amount (length of descending of the pressing member P) of 5 mm.

With all the pressure-sensitive sensors used for measurement, up to the displacement amount of 5 mm, the voltage decreased as the pressing member descends, but when the displacement amount is more than 5 mm, the changes in the voltage was small.

From the above, it can be regarded that the maximum load that these pressure-sensitive sensors can measure was the voltage with the displacement amount of 5 mm.

Table 4 shows the voltage immediately after decompression (restoring the pressing member P to the original position) and the voltage after 10 minutes from decompression, after measuring the voltage with the displacement amount of 5 mm.

INDUSTRIAL APPLICABILITY

The photoelastic polyurethane resin of the present invention can be used as a detection member such as a pressure-sensitive sensor and a bending sensor in robots and devices in various industrial fields.

DESCRIPTION OF REFERENCE NUMERAL 1 sensor
2 resin member

TABLE 4

|  |  | Example 1 | Example 10 | Example 11 | Example 12 | Example 4 | Example 6 | Example 13 | Example 14 | Example 15 |
|---|---|---|---|---|---|---|---|---|---|---|
| Aromatic ring concentration (mass %) | | 15.5 | 15.2 | 14.5 | 14.0 | 13.8 | 13.4 | 12.4 | 10.8 | 10.0 |
| Glass transition temperature (° C.) | | −24 | −24 | −29 | −30 | −31 | −34 | −38 | −44 | −47 |
| Photoelasticity (25° C.) | Photoelastic constant ($10^{-12}Pa^{-1}$) | 5850 | 7550 | 7230 | 7580 | 4780 | 3690 | 3500 | 3060 | 2980 |
| | Young's modulus (MPa) | 4.48 | 3.79 | 3.93 | 3.61 | 4.90 | 4.57 | 4.02 | 4.53 | 3.66 |
| Load test (sensitivity) | Voltage at 300N (V) = $V_{300}$ | 0.67 | 0.68 | 0.68 | 0.62 | 0.57 | 0.56 | 0.36 | 0.47 | 0.27 |
| | Sensitivity (V) = 2.000-$V_{300}$ | 1.33 | 1.32 | 1.32 | 1.39 | 1.43 | 1.44 | 1.64 | 1.53 | 1.74 |
| Load test (hysteresis) | Load (N) with displacement amount of 5 mm | 1108 | 897 | 1041 | 893 | 912 | 1135 | 665 | 737 | 690 |
| | Voltage (V) with displacement amount of 5 mm | 0.35 | 0.35 | 0.31 | 0.20 | 0.31 | 0.22 | 0.16 | 0.27 | 0.09 |
| | Voltage (V) immediately after decompression | 1.84 | 1.98 | 2.00 | 1.84 | 1.97 | 1.94 | 1.72 | 2.00 | 1.47 |
| | Voltage (V) 10 minutes after decompression | 1.95 | 2.00 | 2.00 | 1.95 | 2.00 | 1.97 | 1.95 | 2.00 | 1.85 |

Table 4 shows that when the photoelastic constant is higher than $6000\times10^{-12}$ $Pa^{-1}$, sensitivity tends to be low, and meanwhile, when the photoelastic constant is lower than $3500\times10^{-12}$ $Pa^{-1}$, the maximum load that allows for measurement, that is, the load with the displacement amount of 5 mm becomes small.

Furthermore, when the photoelastic constant is lower than $3000\times10^{-12}$ $Pa^{-1}$, there were some cases where the voltage after decompression does not recover to 2V even after 10 minutes.

<Bending Sensor>

The bending sensor was made using the photoelastic polyurethane resin obtained in Example 1, as shown in FIG. 12.

The sensor 50 had a bending portion B with a length of 30 mm.

Then, the sensor 50 is set, as shown in FIG. 13, on the arm 61, and the angle and the voltage were recorded while changing continuously the angle of the arm 61 from 0° (horizontal) to 90° (vertical).

Thereafter, the angle and voltage were recorded similarly while returning the angle of the arm 61 from 90° to 0°. The results are shown in FIG. 17.

While the illustrative embodiments of the present invention are provided in the above description, such is for illustrative purpose only and it is not to be construed restrictively. Modification and variation of the present invention that will be obvious to those skilled in the art is to be covered by the following claims.

3B LED
4B photodiode
31 pressure-sensitive mat
35 resin sheet
36 LED
39 resin rod
40 photodiode
50 sensor
C cushioning material

The invention claimed is:

1. Photoelastic polyurethane resin having
   a Young's modulus at 25° C. of 2 to 5 MPa,
   a photoelastic constant at 25° C. of $1000\times10^{-12}$ $Pa^{-1}$ to $100000\times10^{-12}$ $Pa^{-1}$, and
   a glass transition temperature of −60° C. to −27° C.

2. A detection member comprising:
   the photoelastic polyurethane resin according to claim 1,
   a light generating member disposed at a first position at which light can be allowed to enter the photoelastic polyurethane resin, and
   a light receiving member disposed at a second position that is different from the first position and at which the light that is allowed to exit from the light generating member and passed through the photoelastic polyurethane resin can be received.

3. The detection member according to claim 2, wherein the photoelastic polyurethane resin is in a sheet shape.

4. The detection member according to claim 2, wherein the photoelastic polyurethane resin is in a bar shape.

5. The detection member according to claim 2, wherein the detection member detects a pressure applied to the photoelastic polyurethane resin.

6. The detection member according to claim 2, wherein the detection member detects bending of the photoelastic polyurethane resin.

7. The detection member according to claim 2, further comprising a cushioning material laminated on the photoelastic polyurethane resin.

8. A robot comprising the detection member according to claim 2.

9. A robot comprising:
the detection member according to claim 5, and
a processor that measures a pressure applied to the detection member based on the detection of the detection member.

10. A method for producing photoelastic polyurethane resin, the method comprising allowing
aromatic polyisocyanate,
a high-molecular weight polyol having an average hydroxyl number of 20 to 500 mgKOH/g, and
a low-molecular-weight polyol having an average hydroxyl number of more than 500 mgKOH/g to react,
wherein the photoelastic polyurethane resin has a Young's modulus at 25° C. of 2 to 5 MPa,
a photoelastic constant at 25° C. of $1000 \times 10^{-12}$ $Pa^{-1}$ to $100000 \times 10^{-12}$ $Pa^{-1}$, and
a glass transition temperature of −60° C. to −27° C.

* * * * *